(12) United States Patent
Oyama et al.

(10) Patent No.: US 12,200,334 B2
(45) Date of Patent: Jan. 14, 2025

(54) IMAGE CAPTURING APPARATUS CAPABLE OF COOLING IMAGE SENSOR

(71) Applicant: CANON KABUSHIKI KAISHA, Tokyo (JP)

(72) Inventors: Kazuna Oyama, Kanagawa (JP); Hayato Mano, Tokyo (JP); Kenji Yamagata, Kanagawa (JP); Yoji Oya, Kanagawa (JP); Yoshinobu Shibayama, Kanagawa (JP); Yusuke Mogi, Kanagawa (JP); Kazuo Yamamoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 124 days.

(21) Appl. No.: 18/192,038

(22) Filed: Mar. 29, 2023

(65) Prior Publication Data
US 2023/0328347 A1 Oct. 12, 2023

(30) Foreign Application Priority Data
Apr. 7, 2022 (JP) .................................. 2022-064066

(51) Int. Cl.
| | |
|---|---|
| H04N 23/52 | (2023.01) |
| H04N 23/54 | (2023.01) |
| H04N 23/68 | (2023.01) |

(52) U.S. Cl.
CPC ............. *H04N 23/52* (2023.01); *H04N 23/54* (2023.01); *H04N 23/687* (2023.01)

(58) Field of Classification Search
CPC ........ H04N 23/50; H04N 23/52; H04N 23/54; H04N 23/685; H04N 23/687; G03B 17/55
See application file for complete search history.

(56) References Cited

U.S. PATENT DOCUMENTS

| | | | |
|---|---|---|---|
| 2014/0055671 A1* | 2/2014 | Kawamura | H04N 5/64 348/374 |
| 2023/0035644 A1* | 2/2023 | Kuroki | H05K 7/2039 |
| 2023/0396863 A1* | 12/2023 | Abe | H04N 23/51 |

FOREIGN PATENT DOCUMENTS

| | | |
|---|---|---|
| JP | 2009-071516 A | 4/2009 |
| JP | 5631116 B2 | 11/2014 |

* cited by examiner

*Primary Examiner* — Daniel M Pasiewicz
(74) *Attorney, Agent, or Firm* — Cowan, Liebowitz & Latman, P.C.

(57) ABSTRACT

An image capturing apparatus equipped with a function of performing image stabilization by moving an image capturing section (image sensor) and capable of effectively cooling the image sensor without increasing the size of the apparatus. The apparatus includes an image sensor board on which the image sensor is mounted, an image stabilization mechanism for performing image stabilization by moving the image sensor board, a first duct having an air flow passage and movable, a second duct having an air flow passage and fixedly disposed and connected to the first duct, and a cooling fan for causing outside air to flow through the first duct and the second duct. The image sensor board is held on the first duct.

25 Claims, 35 Drawing Sheets

IMAGE CAPTURING APPARATUS CAPABLE OF COOLING IMAGE SENSOR

BACKGROUND OF THE INVENTION

Field of the Invention

The present invention relates to an image capturing apparatus that is capable of cooling an image sensor and the like.

Description of the Related Art

In recent years, an image capturing apparatus has come to produce a recorded image improved in image quality by a higher resolution and a higher frame rate. In such an image capturing apparatus, signal processing load and power consumption are increased. As a result, an image capturing section and a signal processor including a data recording section generate markedly large amounts of heat. Electronic components incorporated in the image capturing apparatus are degraded in performance under a high temperature, and hence the image capturing apparatus is required to be internally provided with a cooling structure.

A conventional cooling structure is configured to perform heat dissipation by transferring heat generated by a heat generating component to a high thermal conductivity member. For example, Japanese Patent No. 5631116 and Japanese Laid-Open Patent Publication (Kokai) No. 2009-71516 disclose respective image capturing apparatuses in which are proposed heat dissipating means for forcedly cooling an image capturing section.

The image capturing apparatus disclosed in Japanese Patent No. 5631116 is configured to cool an image sensor by providing an opening formed by partially opening a casing, and forcedly cooling a heat dissipation component thermally connected to the image sensor. However, an area where the heat dissipation component thermally connected to the image sensor is cooled is only an area in the vicinity of the opening formed by partially opening the casing, and hence the volume of heat dissipation e.g. from the image sensor is not necessarily sufficient. Further, the image capturing apparatus disclosed in Japanese Laid-Open Patent Publication (Kokai) No. 2009-71516 has a problem that a cooling device is required to be attached to the outside of the body to forcedly cool the image sensor, resulting in an increased size of the image capturing apparatus. Further, recently, an image capturing apparatus has been developed which is equipped with an image stabilization function for preventing an image blur by moving an image capturing section within a predetermined range so as to absorb vibration applied from the outside to the image capturing apparatus, but it has been impossible to sufficiently cool the image capturing section.

SUMMARY OF THE INVENTION

The present invention provides an image capturing apparatus that is equipped with an image stabilization function performed by moving an image capturing section (image sensor) and is capable of effectively cooling the image sensor without increasing the size of the image capturing apparatus.

In a first aspect of the present invention, there is provided an image capturing apparatus including an image sensor board on which an image sensor is mounted, an image stabilization mechanism which performs image stabilization by moving the image sensor board, a first duct which has an air flow passage and is movable, a second duct which has an air flow passage, and is fixed and connected to the first duct, and a cooling fan for causing outside air to flow through the first duct and the second duct, wherein the image sensor board is held on the first duct.

In a second aspect of the present invention, there is provided an image capturing apparatus including an image sensor board on which an image sensor is mounted, an image stabilization mechanism which performs image stabilization by moving the image sensor board, a first duct which has an air flow passage and is fixedly disposed between the image sensor board and a mount, a second duct which has an air flow passage and is thermally connected to a control circuit board, a cooling fan that is connected to the second duct so as to discharge air heated in the image capturing apparatus, a third duct which has an air flow passage, and is connected to an inlet port and fixed, and a fourth duct which has an air flow passage and is connected to the first duct and the third duct, wherein the third duct is disposed on a side surface of a shutter or an ND unit, which is arranged between the image sensor board and the mount.

According to the present invention, it is possible to provide an image capturing apparatus that is equipped with the image stabilization function performed by moving the image capturing section and is capable of effectively cooling the image sensor without increasing the size of the image capturing apparatus.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof. However, the components described in the following embodiment are described only by way of example, and are by no means intended to limit the scope of the present invention to them alone. First, a first embodiment of the present invention will be described. Note that a "duct" in this specification refers to a member having an air flow passage. Further, continuous associated ducts are simply referred to as "the duct", as deemed appropriate.

First, components of an image capturing apparatus 1 according to the first embodiment of the present invention will be described with reference to FIGS. 1 and 2. Note that, for convenience of explanation, the XYZ coordinate system is defined in the following manner: A "Z-axis" is defined as an axis in a photographing optical axis direction of the image capturing apparatus 1, and a side toward an object to be photographed is defined as the "positive side". Further, an "X-axis" is defined as an axis in a direction of width of the image capturing apparatus 1 on a plane perpendicular to the Z-axis, and the right side as viewed from the object side toward the image capturing apparatus 1 is defined as the "positive side". Further, a "Y-axis" is defined as an axis in a top-bottom direction of the image capturing apparatus 1, and a side toward the top is defined as the "positive side".

Figure 1:
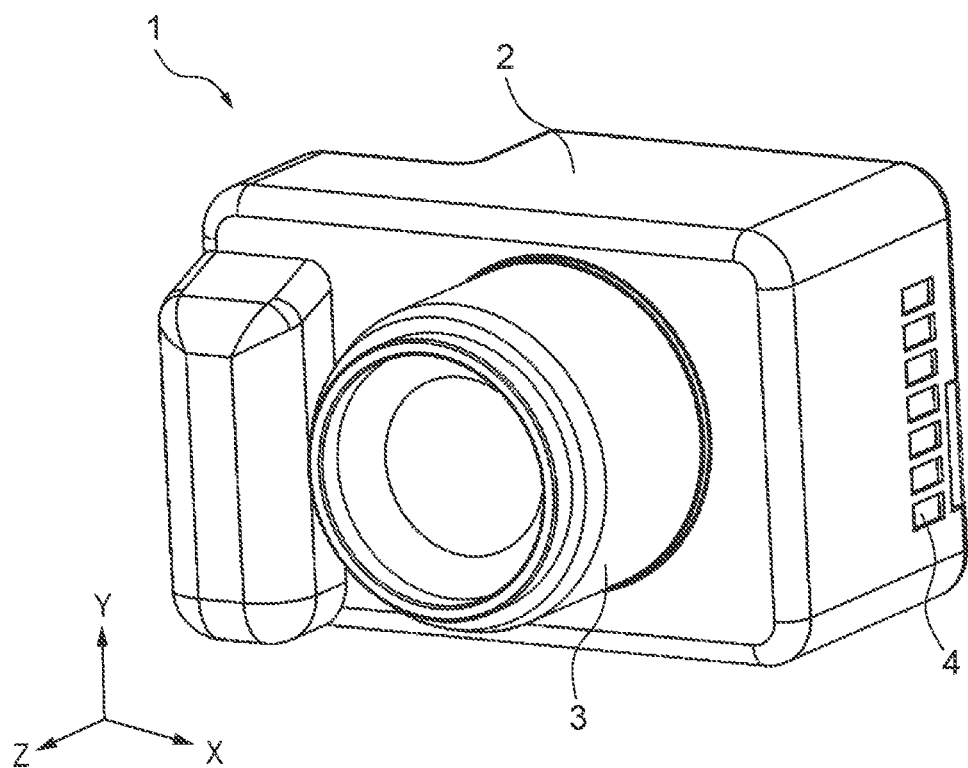
FIG. 1 is a front perspective view of an image capturing apparatus.
Figure 2:
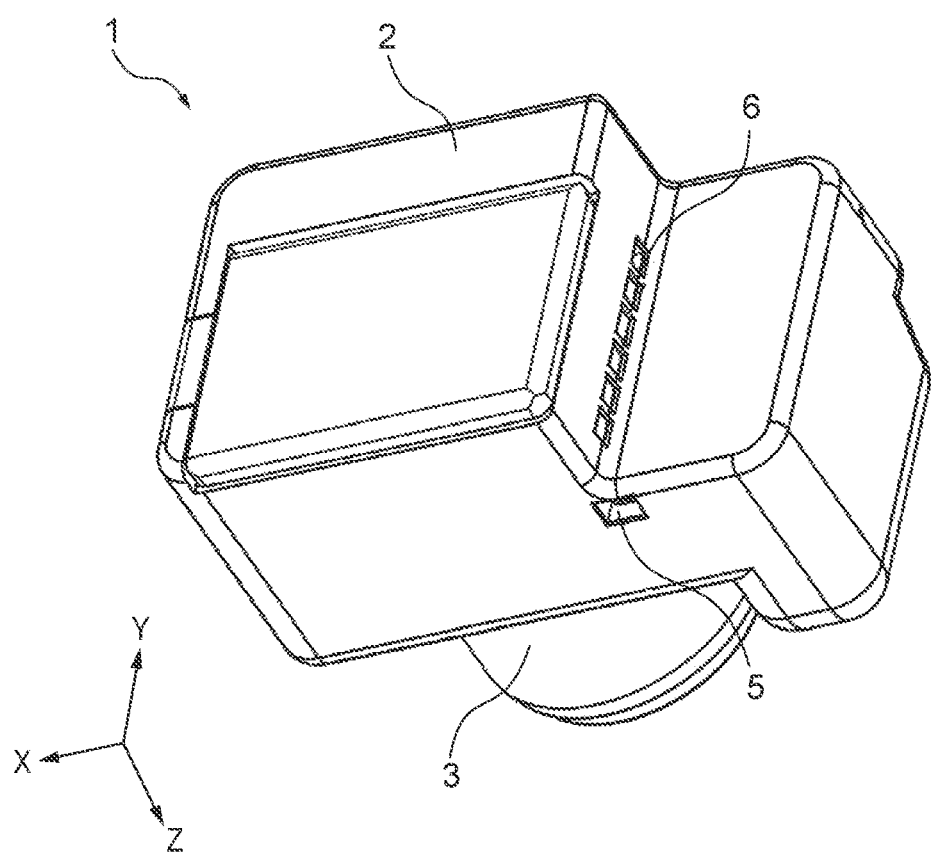
FIG. 2 is a rear perspective view of the image capturing apparatus.

FIGS. 1 and 2 are perspective views roughly showing the components of the image capturing apparatus 1. FIG. 1 is a front perspective view of the image capturing apparatus 1, and FIG. 2 is a rear perspective view of the image capturing apparatus 1. As shown in FIG. 1, the image capturing apparatus 1 includes an image capturing apparatus body 2 and a lens 3. The image capturing apparatus body 2 has a main circuit board arranged therein, on which a controller that controls the overall operation of the image capturing apparatus 1 and an image processor are mounted. Further, the image capturing apparatus body 2 incorporates components for main functions of the image capturing apparatus 1, such as an image sensor for converting light incident through the lens 3 to electrical signals, a power supply section, a recording section for recording an image, and a variety of operation portions. Then, as shown in FIG. 1, the lens 3 is attached to the front side (the photographing object side (+Z-axis side)) of the image capturing apparatus 1 and is exchangeable with a variety of lenses according to a photographing circumstance.

Further, as shown in FIG. 1, the right side (+X-axis side) of the image capturing apparatus body 2, as viewed from the object side, is formed with a first outlet port 4 for discharging high-temperature air (heated air) within the body to the outside by a forced cooling mechanism using a cooling fan, described hereinafter. Further, as shown in FIG. 2, the bottom side (−Y-axis side) of the image capturing apparatus body 2 is formed with a first inlet port 5 for sucking cool outside air into the image capturing apparatus body 2 by the forced cooling mechanism using the cooling fan, described hereinafter. Further, the left side (−X-axis side) of the image capturing apparatus body 2, as viewed from the object side, is similarly formed with a second inlet port 6 for sucking cool outside air into the image capturing apparatus body 2 by the forced cooling mechanism using the cooling fan, described hereinafter.

Figure 3:
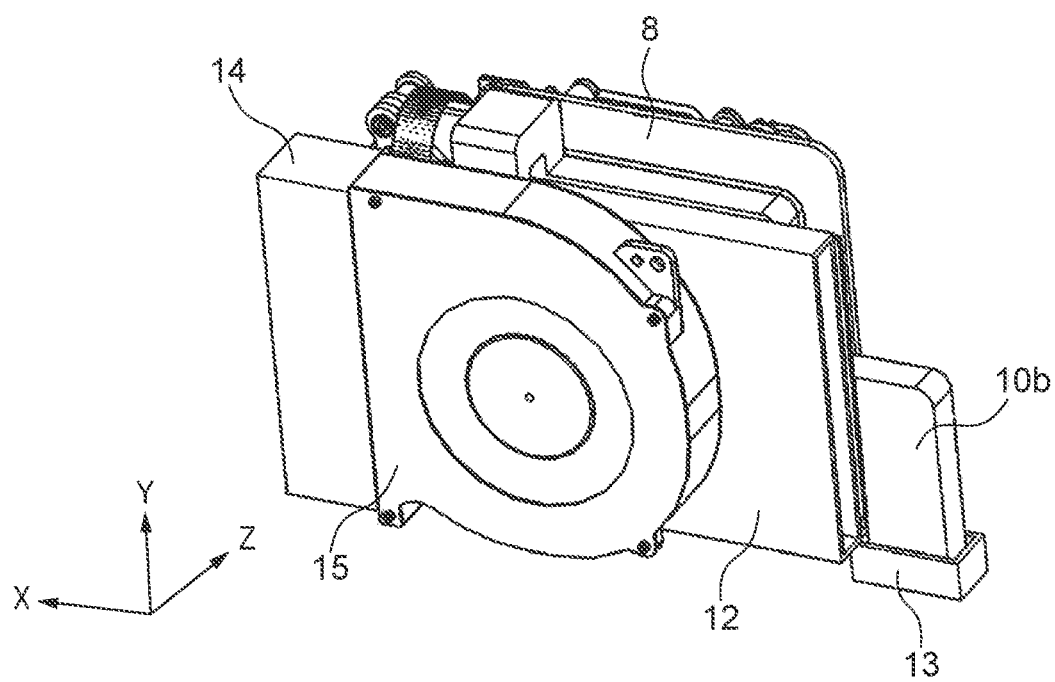
FIG. 3 is a rear perspective view showing internal components of the image capturing apparatus.
Figure 4:
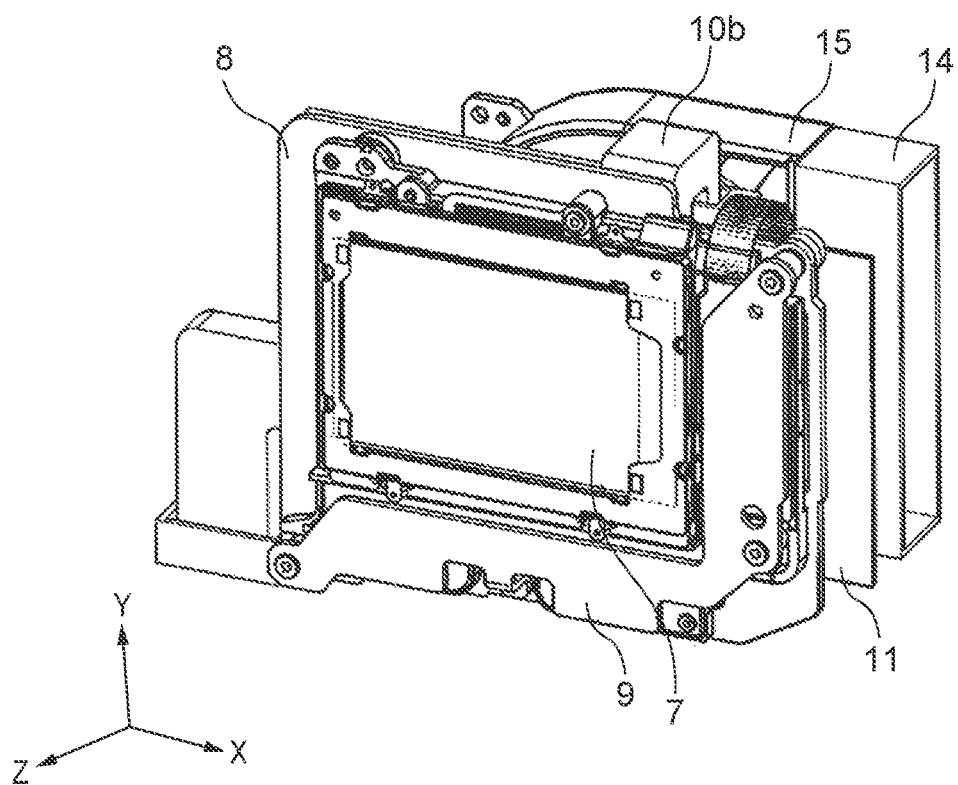
FIG. 4 is a front perspective view showing the internal components of the image capturing apparatus.
Figure 5:
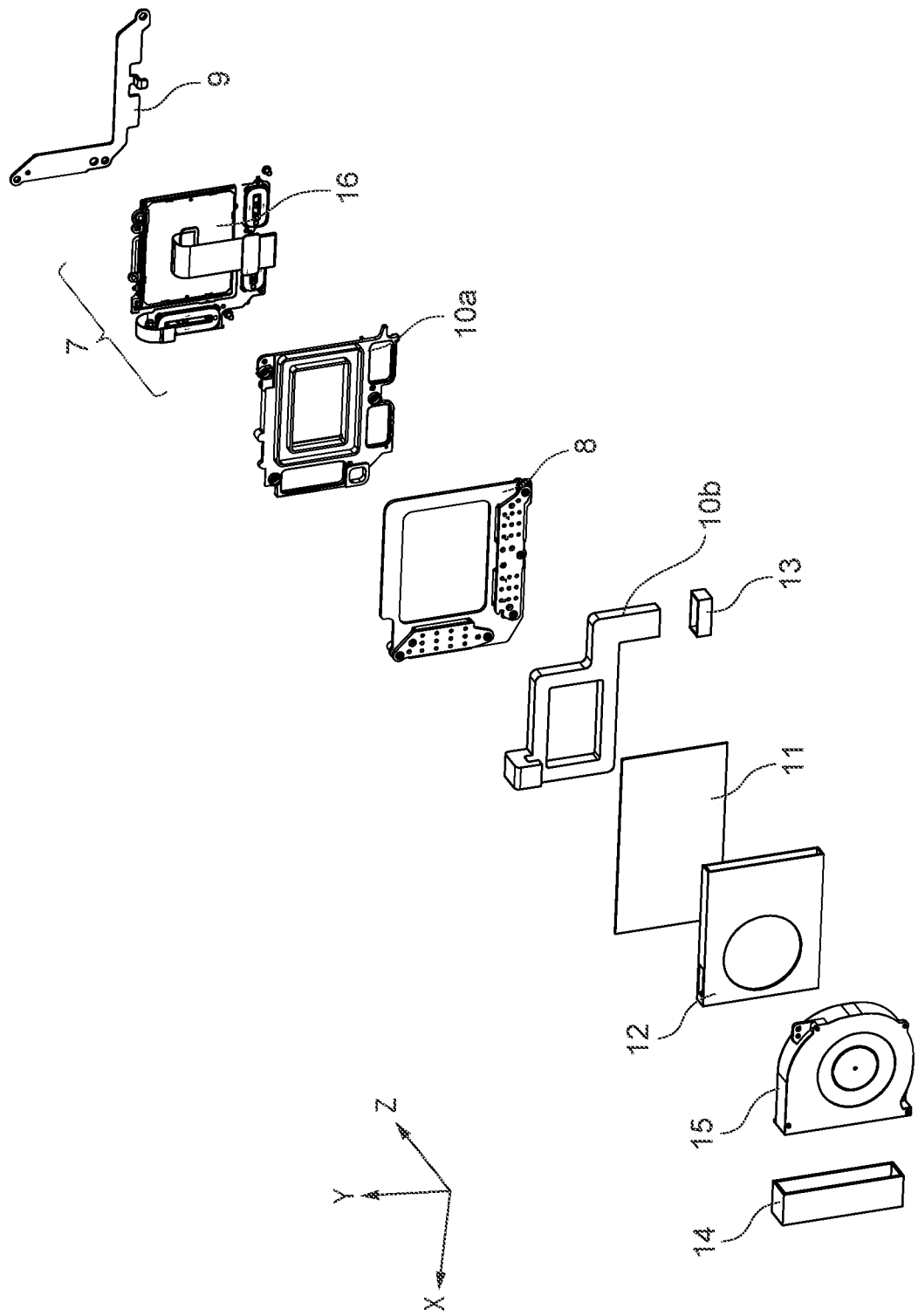
FIG. 5 is a rear exploded perspective view showing the internal components of the image capturing apparatus.
Figure 6:
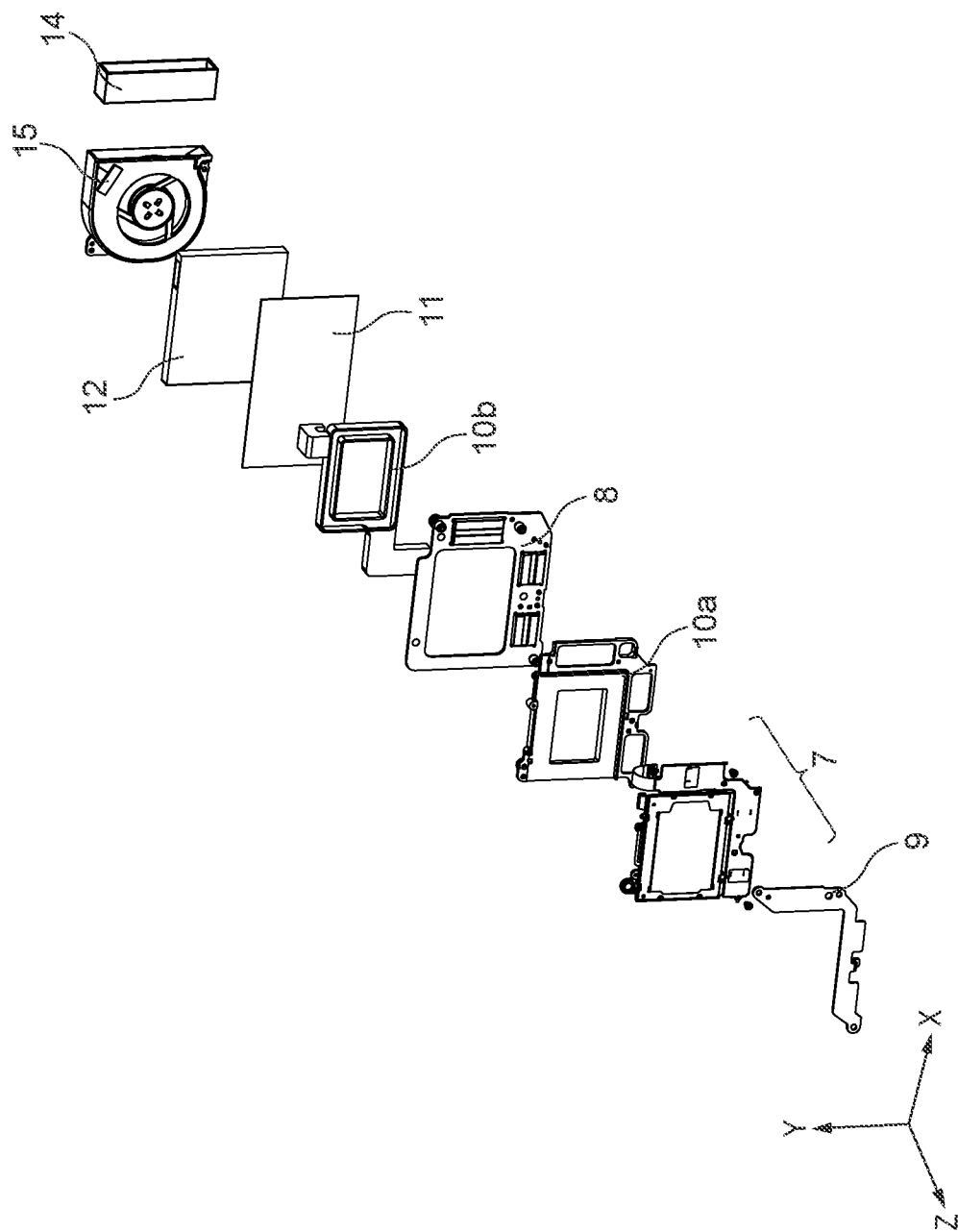
FIG. 6 is a front exploded perspective view showing the internal components of the image capturing apparatus.

Next, the outline of the components arranged inside the image capturing apparatus 1 will be described with reference to FIGS. 3, 4, 5, and 6. FIG. 3 is a rear perspective view showing the internal components of the image capturing apparatus 1, and FIG. 4 is a front perspective view showing the internal components of the image capturing apparatus 1. FIG. 5 is a rear exploded perspective view showing the internal components of the image capturing apparatus 1, and FIG. 6 is a front exploded perspective view showing the internal components of the image capturing apparatus 1.

Figure 8A:
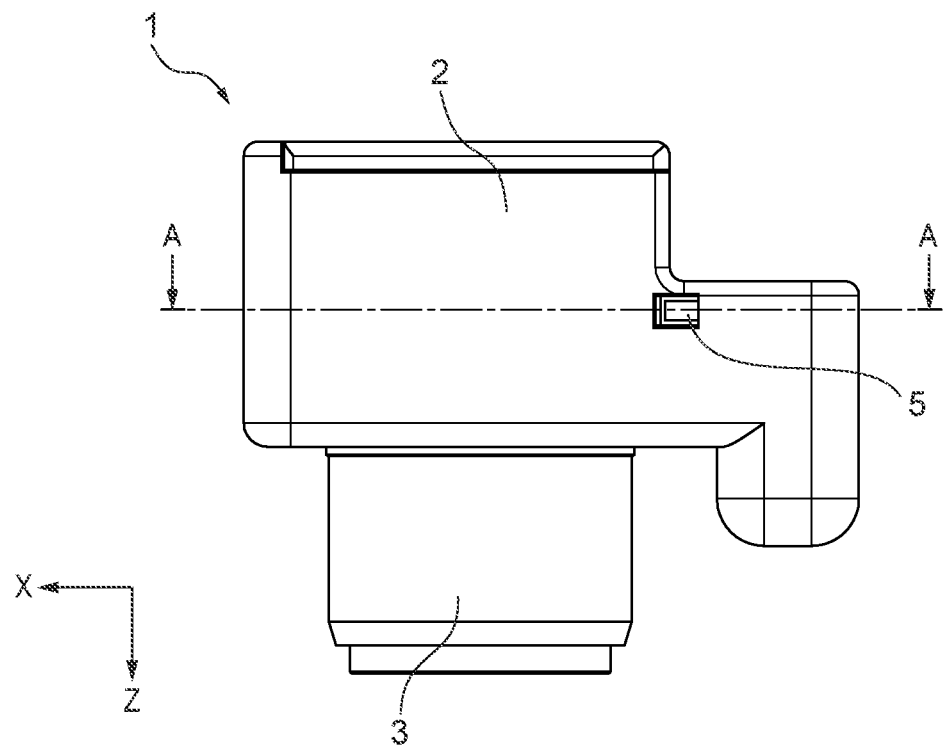
FIG. 8A is a lower side view showing a heat dissipation structure of the image capturing apparatus.
Figure 8B:
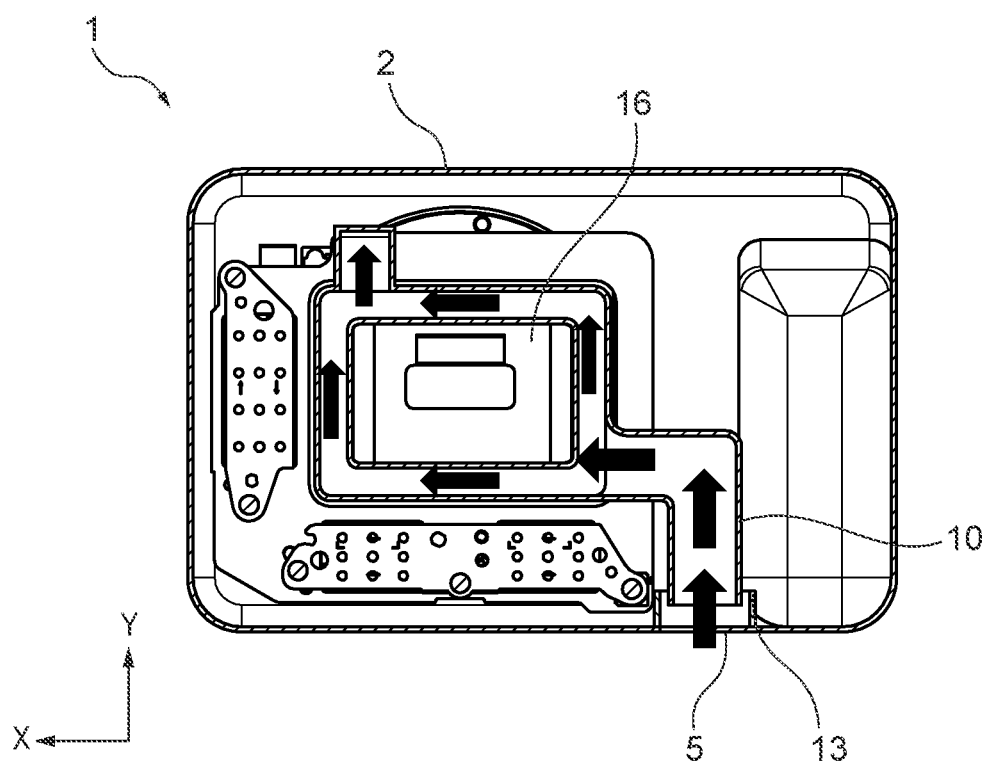
FIG. 8B is a cross-sectional view taken along A-A in FIG. 8A.

As shown in FIGS. 3 to 6, inside the image capturing apparatus 1, there are arranged an image sensor unit 7 including an image sensor board 16 on which the image sensor is mounted, an image stabilization unit 8, an image stabilization unit-holding plate 9, and a first duct 10 (see FIG. 8B). The first duct is formed by a first duct base 10*a* and a first duct-holding portion 10*b*. Further, inside the image capturing apparatus 1, there are arranged a control circuit board 11, a second duct 12, a third duct 13, a fourth duct 14, and a cooling fan 15. Note that in the present embodiment, only the components which are related to the present invention are described, and the other components are omitted from illustration and explanation.

Figure 7A:
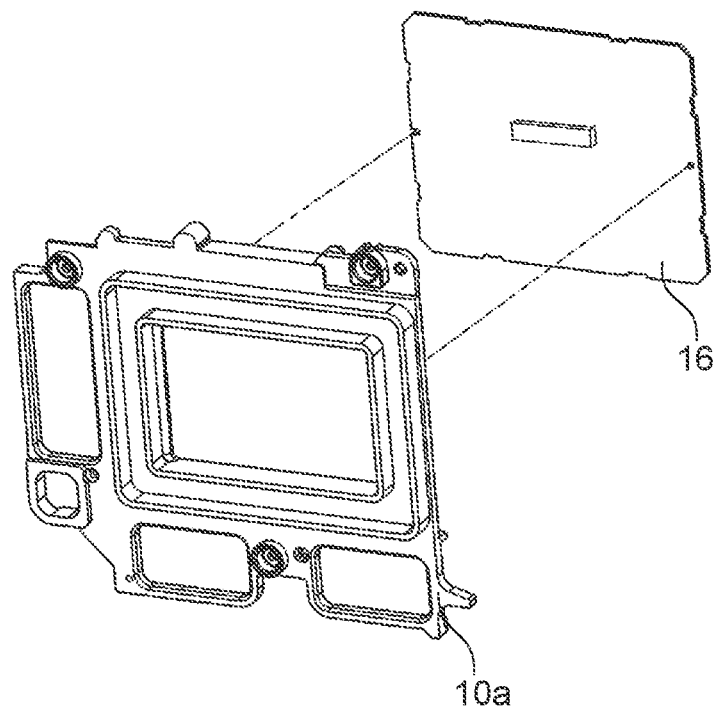
FIG. 7A is a view useful in explaining sticking/fixing of an image sensor board.
Figure 7B:
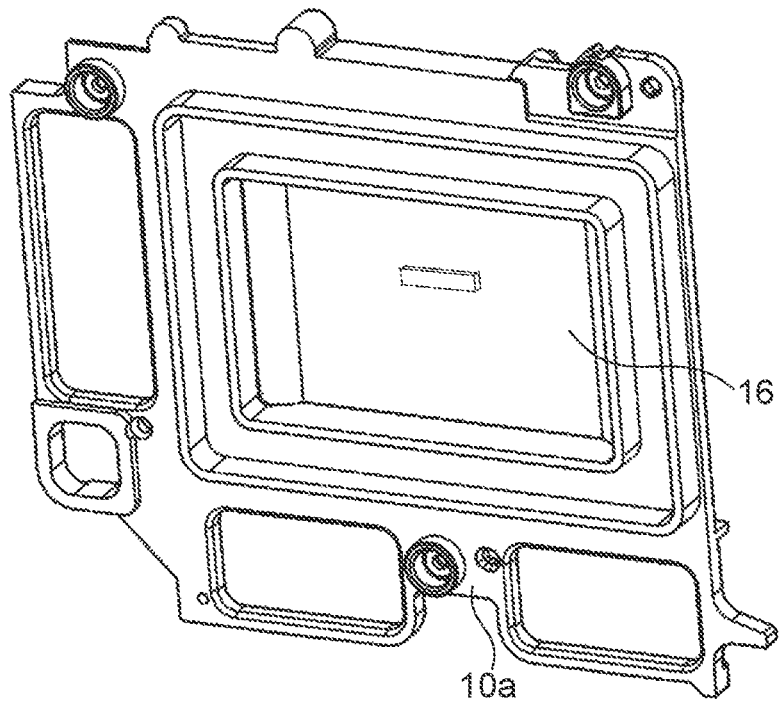
FIG. 7B is a view useful in explaining sticking/fixing of the image sensor board 16.

FIGS. 7A and 7B are views useful in explaining sticking/fixing of the image sensor board 16 to the first duct base 10a. As shown in FIGS. 7A and 7B, the image sensor board 16 is held in a state sticked/fixed to the first duct base 10a. With this, the image sensor board 16 and the first duct base 10a are thermally connected. Therefore, effective heat dissipation from the image sensor board 16 to the first duct base 10a is enabled by a heat dissipation structure, described hereinafter.

Then, as shown in FIGS. 3, 4, 5, and 6, the image sensor unit 7 including the image capturing board 16 sticked/fixed to the first duct base 10a is held by the image stabilization unit 8 and the image stabilization unit-holding plate 9. Further, an air flow passage for dissipating heat in the heat dissipation structure, described hereinafter, is ensured by the first duct-holding portion 10b. The control circuit board 11 that controls the variety of functions equipped in the image capturing apparatus 1 is thermally connected to the second duct 12 by a heat-conductive member, not shown. Further, the third duct 13 is connected to the first inlet port 5 appearing in FIG. 2, and the fourth duct 14 is connected to the second inlet port 6 appearing in FIG. 2. The cooling fan 15 is a so-called centrifugal fan and is configured to discharge air sucked from a surface direction in a centrifugal (side) direction.

Here, although details of a flow of area will be described hereinafter, the image capturing apparatus 1 is configured such that air is sucked in from the first inlet port 5 and the second inlet port 6 (see e.g. FIG. 2), and heat is dissipated by discharging air from the first outlet port 4 using the cooling fan 15. Further, an image stabilization mechanism for controlling the image sensor for image stabilization is a known mechanism, and hence detailed description thereof is omitted, but the image sensor unit 7 is configured to be movable within a predetermined range for image stabilization. With this, as described above, the first duct 10 holding the image sensor board 16 sticked/affixed thereto is also movable within the predetermined range in unison with the image sensor unit 7. On the other hand, the second duct 12, the third duct 13, and the fourth duct 14 are fixed because these ducts are unrelated to image stabilization.

Figure 9A:
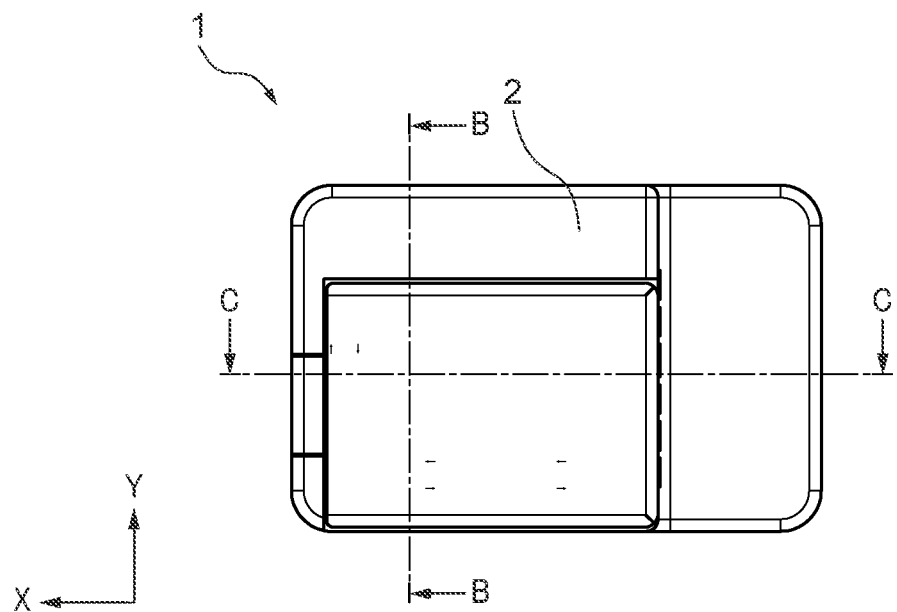
FIG. 9A is a rear side view of the image capturing apparatus.
Figure 9B:
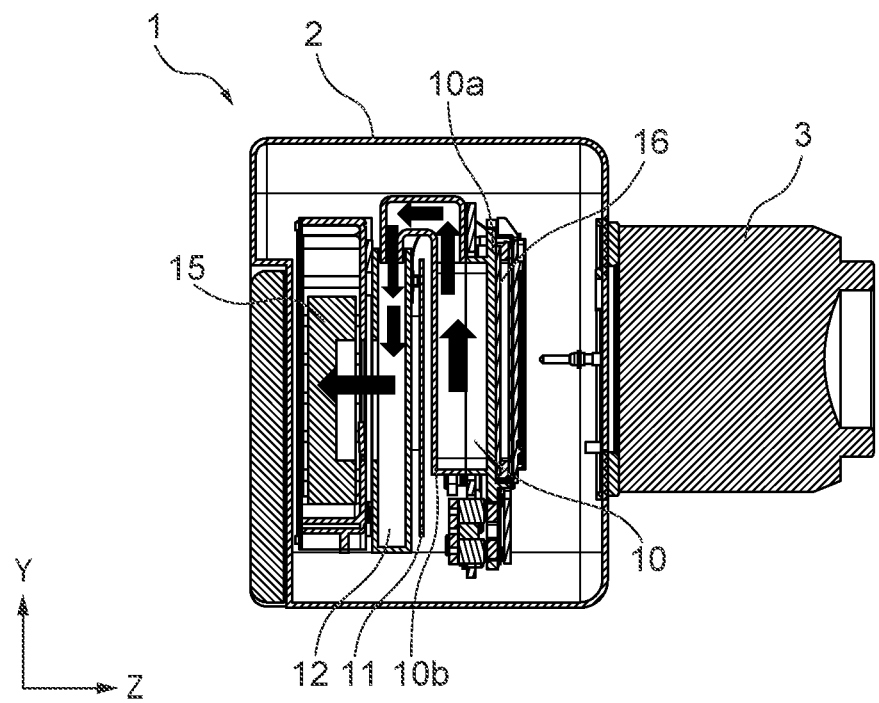
FIG. 9B is a cross-sectional view taken along B-B in FIG. 9A.

The heat dissipation structure of the image capturing apparatus 1 will be described with reference to FIGS. 8A, 8B, 9A, 9B, 9C, and 9D. FIG. 8A is a lower side view showing the heat dissipation structure of the image capturing apparatus 1, and FIG. 8B is a cross-sectional view taken along A-A in FIG. 8A. Further, FIG. 9A is a rear side view of the image capturing apparatus 1, FIG. 9B is a cross-sectional view taken along B-B in FIG. 9A, and FIGS. 9C and 9D are cross-sectional views taken along C-C in FIG. 9A.

Heat generated by the image sensor board 16 is transferred to the first duct 10 formed of metal having high thermal conductivity, such as aluminum, by thermal connection mentioned above. Further, cool outside air sucked in by the cooling fan 15 enters the inside of the image capturing apparatus 1 from the first inlet port 5 and passes through the third duct 13 as shown in FIG. 8B. Then, as shown in FIG. 9B, the air flows into the first duct 10 having a closed space formed by the first duct base 10a and the first duct-holding portion 10b. With this, heat exchange occurs between the air flowing into the first duct 10 and air in the first duct 10 whose temperature has been increased by the heat generated by the image sensor board 16. After that, the resulting high-temperature air passes through the second duct 12 and is taken in by the cooling fan 15.

Figure 9C:
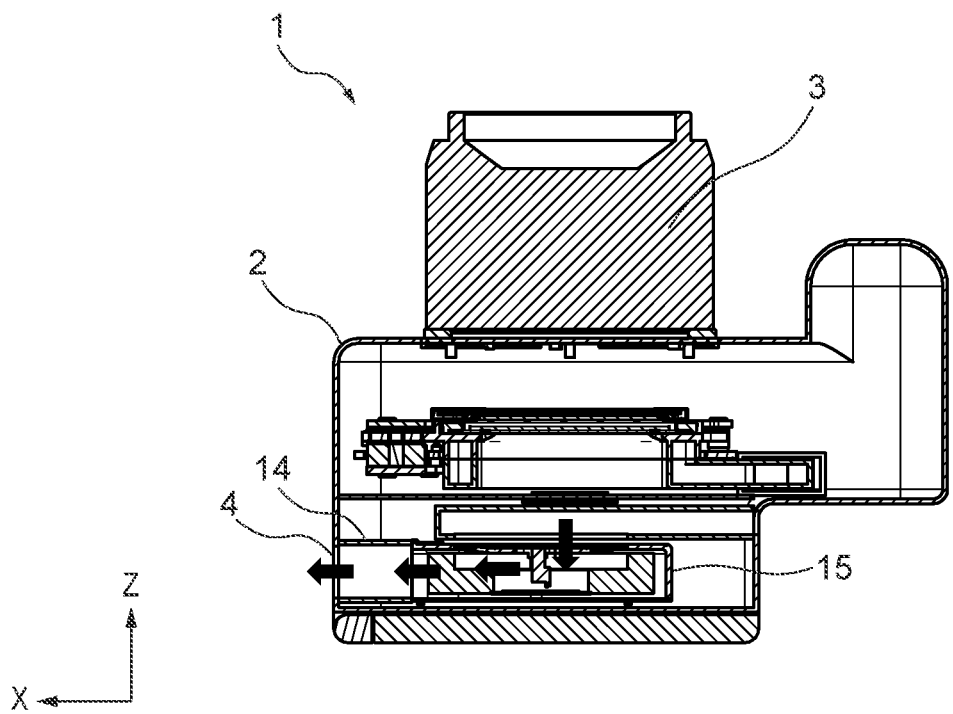
FIG. 9C is a cross-sectional view taken along C-C in FIG. 9A.
Figure 9D:
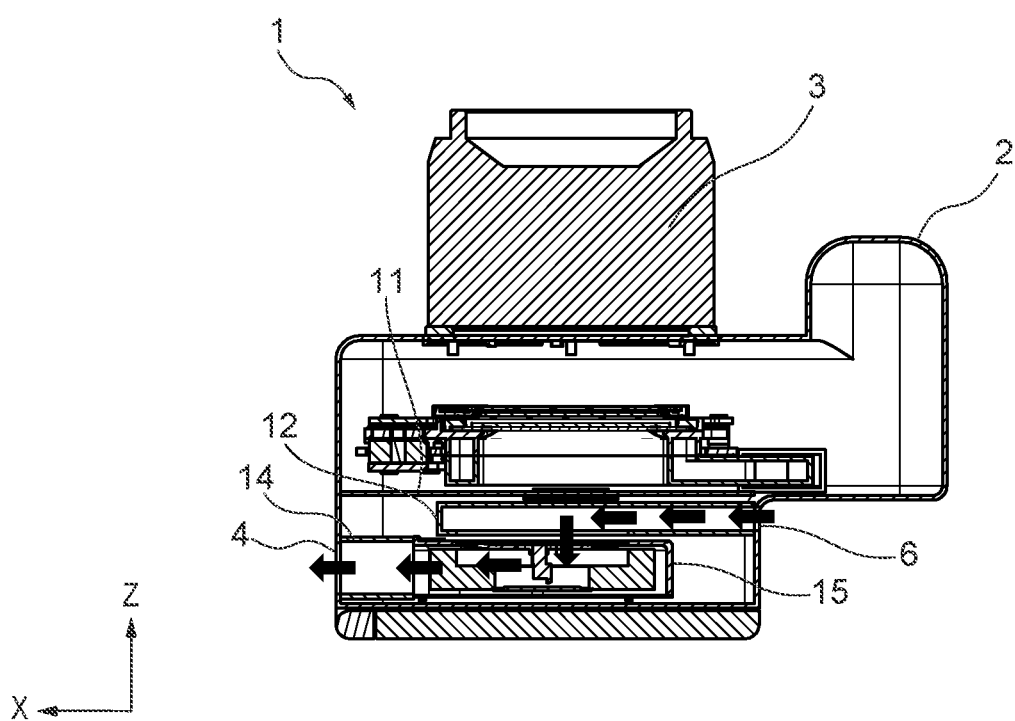
FIG. 9D is a cross-sectional view taken along C-C in FIG. 9A.

Then, as shown in FIG. 9C, the air taken in by the cooling fan 15 passes through the fourth duct 14 and is discharged to the outside from the first outlet port 4. Further, as shown in FIG. 9D, heat generated by the control circuit board 11 is transferred to the second duct 12 formed of metal having high thermal conductivity, such as aluminum, by thermal connection to a heat-conductive member, not shown. Further, cool outside air taken in by the cooling fan 15 enters the inside of the image capturing apparatus 1 from the second inlet port 6 (see e.g. FIG. 2) and flows into the second duct 12. With this, heat exchange occurs between the air flowing into the second duct 12 and air in the second duct 12 whose temperature has been increased. Then, the resulting high-temperature air is taken in by the cooling fan 15 and discharged to the outside from the first outlet port 4 (see e.g. FIG. 2) through the fourth duct 14.

With the above-described arrangement, it is possible to provide the image capturing apparatus 1 that is equipped with the image stabilization function for stabilizing an image by moving the image capturing section (image sensor) and is capable of effectively cooling the image sensor without increasing the size of the image capturing apparatus 1.

Figure 10A:
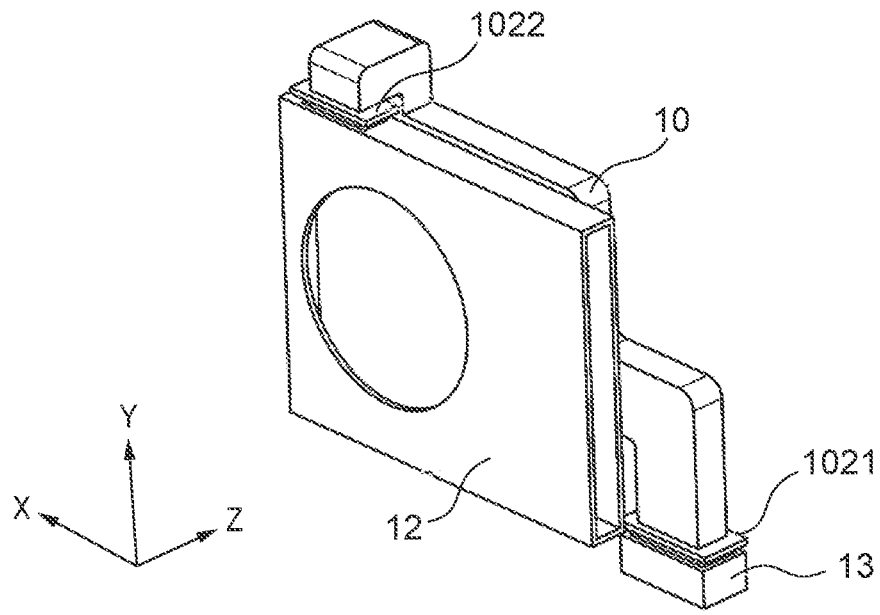
FIG. 10A is a perspective view of a first duct, a second duct, and a third duct.
Figure 10B:
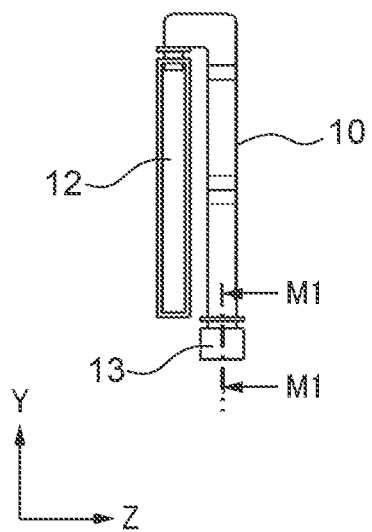
FIG. 10B is a right side view of FIG. 10A.
Figure 10C:
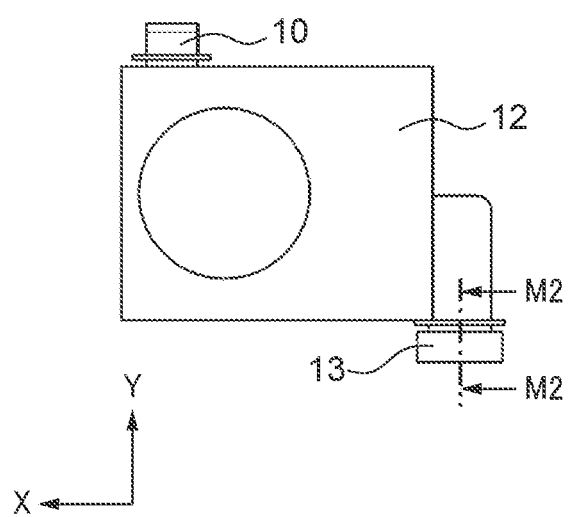
FIG. 10C is a front view of FIG. 10A.
Figure 11:
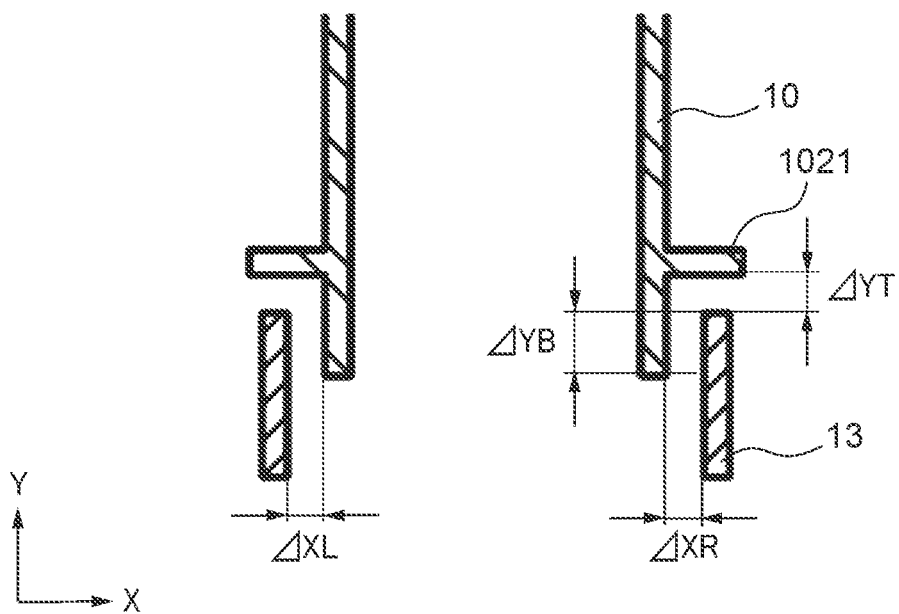
FIG. 11 is a cross-sectional view taken along M1-M1 in FIG. 10B.
Figure 12:
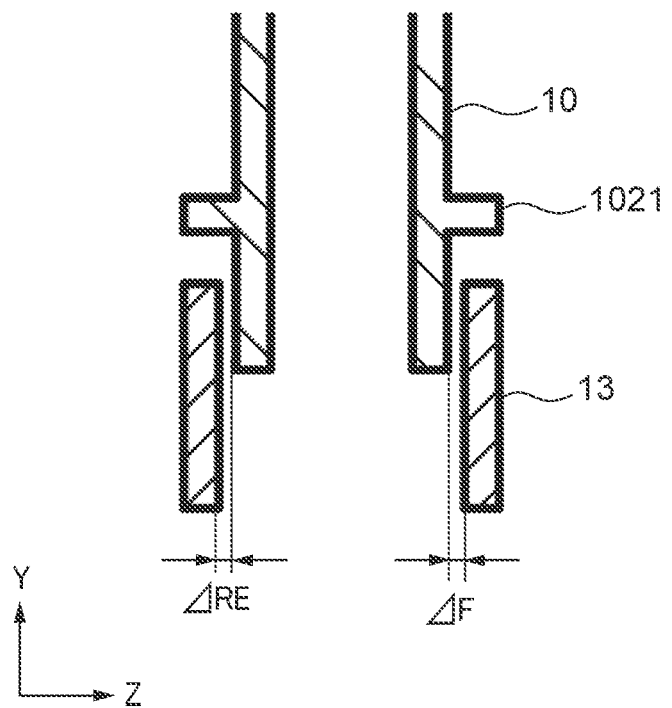
FIG. 12 is a cross-sectional view taken along M2-M2 in FIG. 10C.
Figure 13:
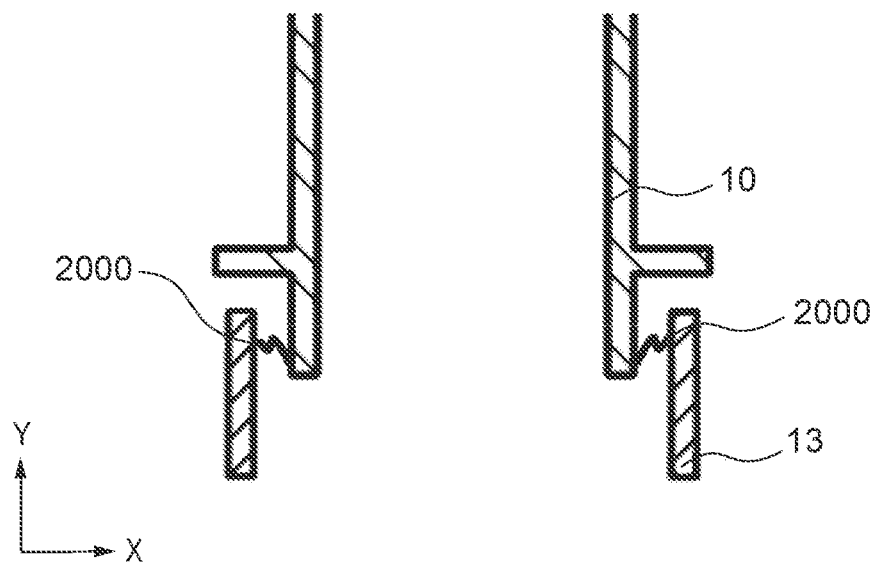
FIG. 13 is a view showing connection of a thin connection member.

Next, a method of connecting the first duct 10 (movable), the second duct 12 (fixed), and the third duct 13 (fixed) will be described. FIG. 10A is a perspective view of the first duct 10, the second duct 12, and the third duct 13. Further, FIG. 10B is a right side view of FIG. 10A (as viewed in the +X-axis direction), and FIG. 10C is a front view of FIG. 10A (as viewed in the +Z direction). Further, FIG. 11 is a cross-sectional view taken along M1-M1 in FIG. 10B, and FIG. 12 is a cross-sectional view taken along M2-M2 in FIG. 10C. FIG. 13 is a view showing connection of a thin connection member. Referring to FIG. 10A, the first duct 10 is formed with a protruding portion 1021 for preventing foreign matter having invaded into the duct from flowing out from a joint between the third duct 13 and the first duct 10. Here, the foreign matter refers to liquid, such as rain drop, powder dust, gravel, and so forth.

Referring to FIG. 11, the first duct 10 is arranged to have an overlap length ΔYB which is larger than the maximum movable distance (maximum length of the movable distance) of the first duct 10 moved by the image stabilization unit 8 (see e.g. FIG. 5), with respect to the third duct 13. Here, the "overlap length" refers to a length of an overlap between the third duct 13 and the first duct 10. With the provision of the overlap between the two ducts, even when the first duct 10 is moved by the image stabilization unit 8, no gap is formed between the first duct 10 and the third duct 13 within an XZ plane. Therefore, there is obtained an effect of preventing the foreign matter from flowing out of the duct even when foreign matter invades into the duct. Further, the first duct 10 on the upper side in the gravity direction is provided inside the third duct 13 on the lower side in the gravity direction. With this arrangement, even when foreign matter invades into the first duct 10, the foreign matter falls into the third duct 13, and hence there is obtained an effect of preventing the foreign matter from flowing out of the duct from a joint between the first duct 10 and the third duct 13.

Further, in FIGS. 11 and 12, spacings "ΔXR, ΔXL, and ΔYT" each of which is larger than the maximum movable distance (maximum length of the movable distance) of the first duct 10 moved by the image stabilization unit 8 are provided between the first duct 10 and the third duct 13. Further, also in a direction in which the first duct 10 is not movable, predetermined spacings ΔF and ΔRE are provided between the first duct 10 and the third duct 13. With the provision of these spacings, it is possible to prevent the image stabilization performance from being lowered by abutment between the first duct 10 and the third duct 13. A method of connecting the first duct 10 and the second duct 12 is the same as the method of connecting the first duct 10 and the third duct 13. Detailed description of the method is omitted.

That is, when connecting the first duct 10 and the second duct 12, the outside of the first duct 10 (one duct) is arranged inside the second duct 12 (the other duct) with a predetermined spacing length and a predetermined overlap length. The predetermined spacing length and the predetermined overlap length can be made longer than the maximum movable length of the first duct 10.

Further, as shown in FIG. 13, the inside of the third duct 13 and the outside of the first duct 10 may be connected by a thin connection member 2000 without providing any spacing in a direction perpendicular to the air flow passage in an area where the first duct 10 and the third duct 13 overlap each other. Note that the thin connection member 2000 is formed of a material which is thin and has flexibility, such as vinyl. Further, the thin connection member 2000 is connected to the ducts 13 and 10 with an excess length sufficiently longer than all of ΔXR, ΔXL, and ΔYB. Therefore, even when the first duct 10 is moved to an end, the thin connection member 2000 remains connected to both the ducts 13 and always with the excess length. As a result, the thin connection member 2000 does not impede movement of the first duct 10 and the image sensor unit 7. Further, there is no possibility that pulling of the thin connection member 2000 by movement of the first duct 10 causes breakage of the thin connection member 2000 itself.

In short, the first duct 10 and the second duct 12 are connected by the thin connection member having flexibility, and the thin connection member can be made to extend longer than the maximum movable length of the first duct 10.

As described above, by connecting between the first duct 10 and the third duct 13 using the thin connection member 2000, it is possible to increase the airtightness. As a result, it is possible to increase the heat dissipation effect obtained by the above-described air flow passages for dissipating heat, which extend from the first inlet port 5 and the second inlet port 6 to the first outlet port 4. Particularly, since the image sensor board 16 is in contact with the first duct 10, a high heat dissipation effect can be obtained.

Next, connection between the first duct 10 (movable), the second duct 12 (fixed), and the third duct 13 (fixed) using extendable/contractable bellows members will be described with reference to FIGS. 14, 15, 16, and 17. Note that in FIGS. 14 and 15, the control circuit board 11 and the cooling fan 15 are each illustrated by broken lines for convenience of explanation. Air sucked in from the first inlet port 5 (see e.g. FIG. 2) by the cooling fan 15 flows into the third duct 13, the first duct 10, and the second duct 12 in the mentioned order and passes through the cooling fan 15. Dust is included in the air sucked from the outside, and hence in a case where dust entering the inside of the image capturing apparatus body 2 is attached to an electronic component or an electronic circuit board, a malfunction can be caused. For this reason, it is desirable that the air flow passage formed by connecting the first duct 10, the second duct 12, and the third duct 13 is configured to prevent air sucked from the outside from flowing out of the air flow passage into the inside of the image capturing apparatus body 2.

Figure 14:
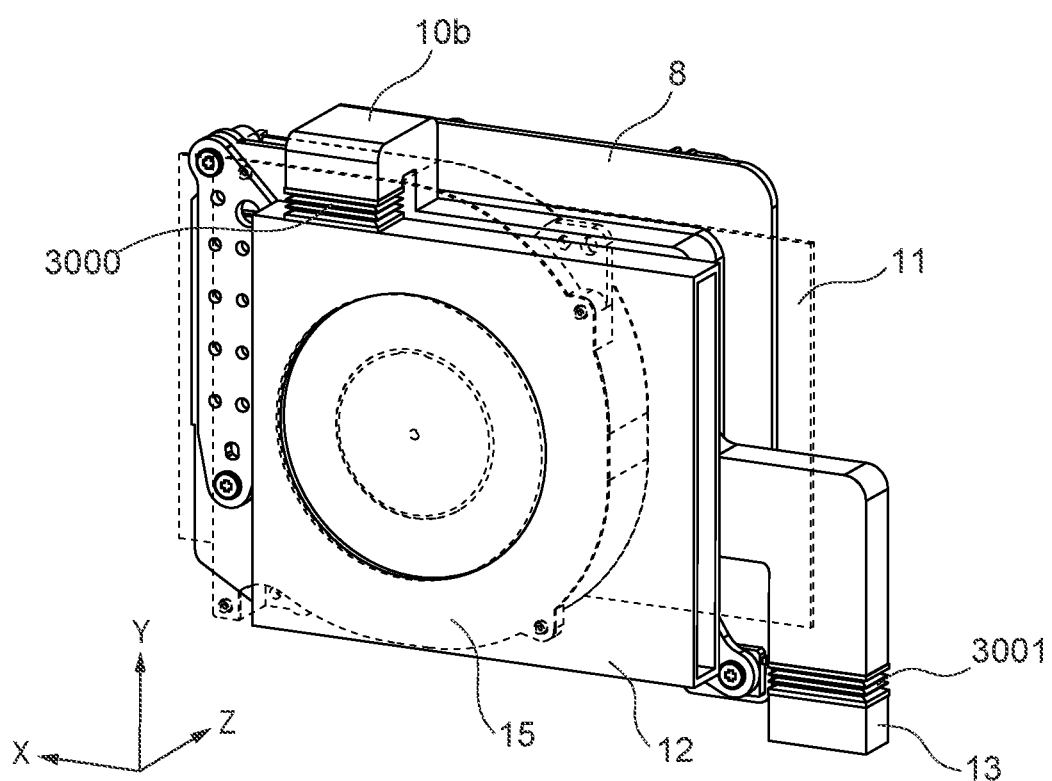
FIG. 14 is a view showing a connection structure between the ducts, which is formed by using bellows members.

Further, since the first duct 10 moves in unison with the image sensor unit 7 moved by the image stabilization mechanism, connection portions connecting the first duct 10 to the second duct 12 and the third duct 13 are each required to be formed into a shape which is deformed in accordance with the movement of the first duct 10. FIG. 14 is a view showing an example of a connection structure between the ducts using bellows members. In the arrangement example shown in FIG. 14, the first duct 10 and the second duct 12 are connected by a bellows member 3000, and the first duct 10 and the third duct 13 are connected by a bellows member 3001. The bellows member 3000 and the bellows member 3001 each have one or more mountain-fold or valley-fold shapes and are extendable and contractable in a direction perpendicular to the optical axis direction (Z-axis direction).

The bellows member 3000 and the bellows member 3001 are each deformed by extension and contraction in accordance with the movement of the first duct 10 moved in unison with the image sensor unit 7, thereby ensuring the sealability of the air flow passage in the connection portions. When the bellows member is deformed by extension and contraction, the deformation of the bellows member can be performed not only by uniform deformation of the whole bellows member, but also by deformation of partial extension and partial contraction of the bellows member. Therefore, even in a case where the image sensor unit 7 is rotationally moved about the optical axis (Z-axis), the bellows member 3000 and the bellows member 3001 can be deformed by following the rotational movement of the the image sensor unit 7. Further, by forming the bellows member 3000 and the bellows member 3001 using a material which is high in thermal conductivity, it is possible to diffuse heat generated in the image sensor unit 7 from the first duct 10 to the second duct 12 and the third duct 13 by heat conduction.

Figure 15:
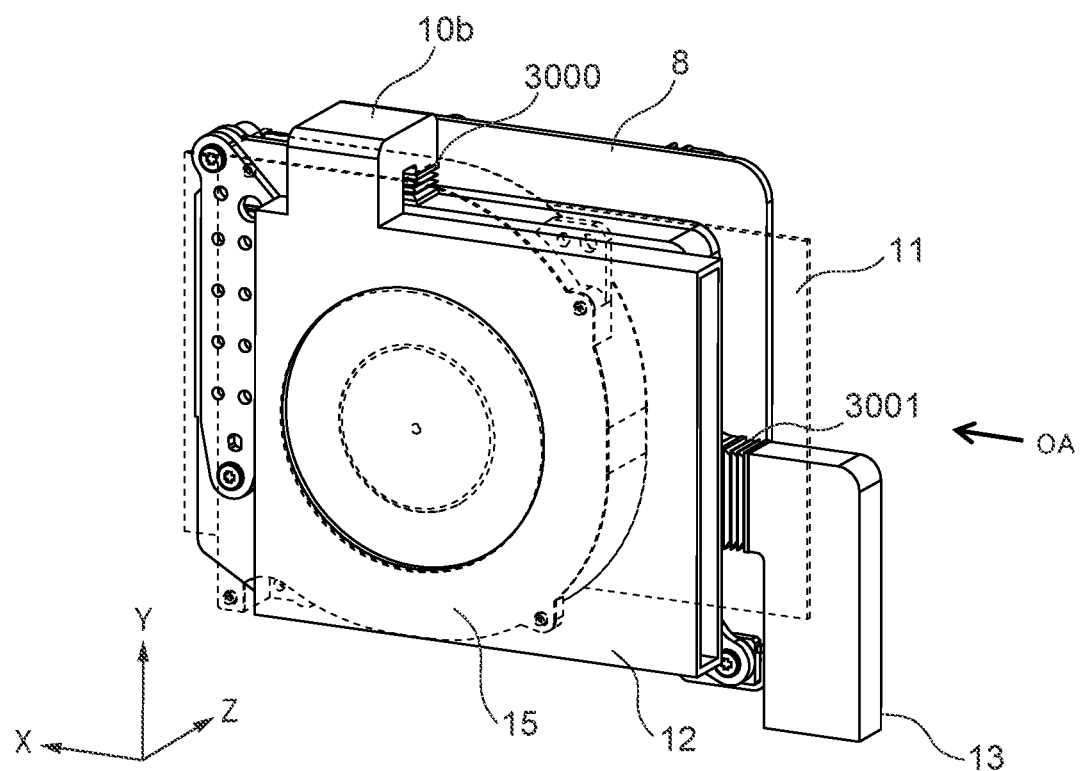
FIG. 15 is a view showing another example of the connection structure between the ducts, which is formed by using the bellows members.
Figure 16:
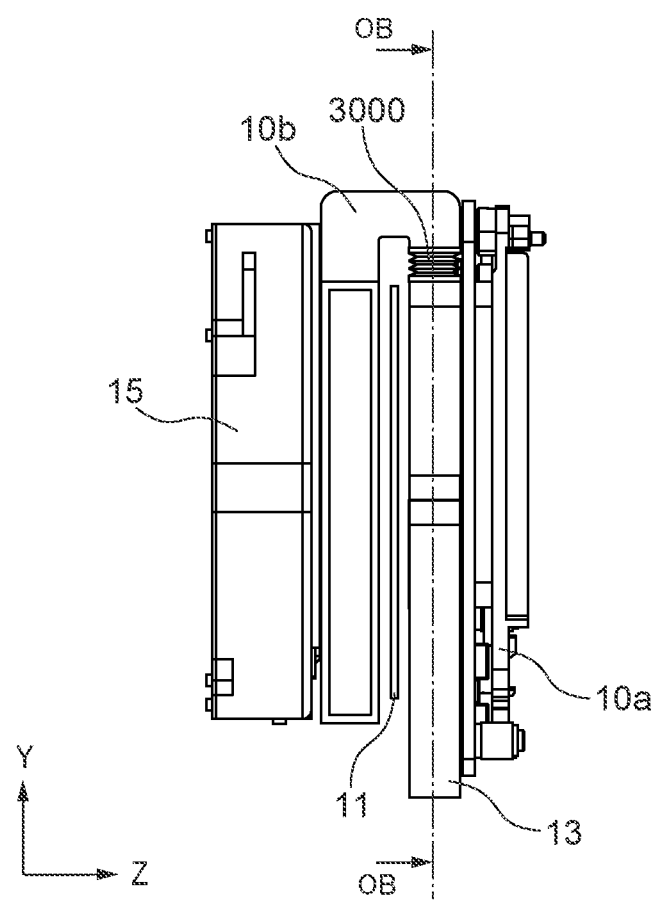
FIG. 16 is an arrow view from a direction indicated by an arrow OA in FIG. 15.
Figure 17:
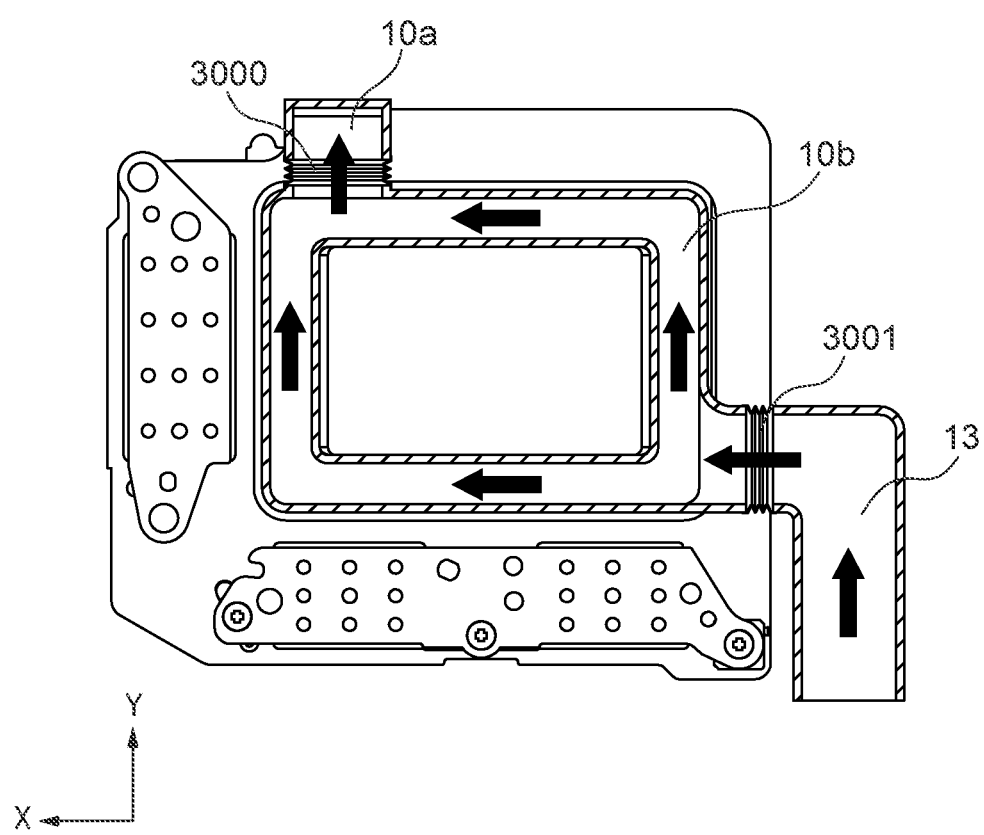
FIG. 17 is a cross-sectional view taken along OB-OB in FIG. 16.

Further, FIG. 15 is a view showing another example of the connection structure, in which the positions of the connection portions where the first duct 10 (movable) is connected to the second duct 12 (fixed) and the third duct 13 (fixed), respectively, are changed. FIG. 16 is an arrow view from a direction indicated by an arrow OA in FIG. 15, and FIG. 17 is a cross-sectional view taken along OB-OB in FIG. 16. The bellows shape can be deformed by following the movement of the first duct 10 in a multi-direction. Therefore, as shown in FIG. 17, the direction of connecting the first duct 10 and the second duct 12 and the direction of connecting the first duct 10 and the third duct 13 (fixed) are not necessarily required to be the same. The position of the connection portion, the connection direction, and the like can be selected in accordance with the layout of the apparatus, as desired.

More specifically, the first duct 10 and the second duct 12 are connected by the bellows member 3000 (extendable/contractable member). The bellows member 3000 (extendable/contractable member) extends/contracts in a direction perpendicular to the optical axis direction in accordance with the movement of the first duct 10. Further, the bellows member 3000 (extendable/contractable member) is formed of a material which is high in thermal conductivity.

Next, the arrangement of a first duct 10A (movable) as an essential component of an image capturing apparatus according to a second embodiment of the present invention will be described with reference to FIGS. 18, 19, 20, and 21. As an example of a method of driving a movable part, for realizing the image stabilization mechanism, there is a method of using a voice coil motor as a driving section (drive source). In this method, driving sections 4003 (specifically, 4003a, 4003b, and 4003c) include coils 4004 (specifically denoted by reference numerals including 4004b and 4004c) as movable potions and magnets 4005 (specifically denoted by reference numerals including 4005b and 4005c) as fixed portions. Then, the movable portions (coils 4004) are moved by using the Lorentz force as the driving force generated by energizing the coils 4004 in magnetic circuits formed by the magnets 4005, respectively. Further, the movable portions are moved in a plurality of directions (translationally moved in the X-axis direction and the Y-axis direction, and rotationally moved about the Z-axis) by the image stabilization mechanism, and hence the driving sections 4003 are also provided in plurality.

Figure 18:
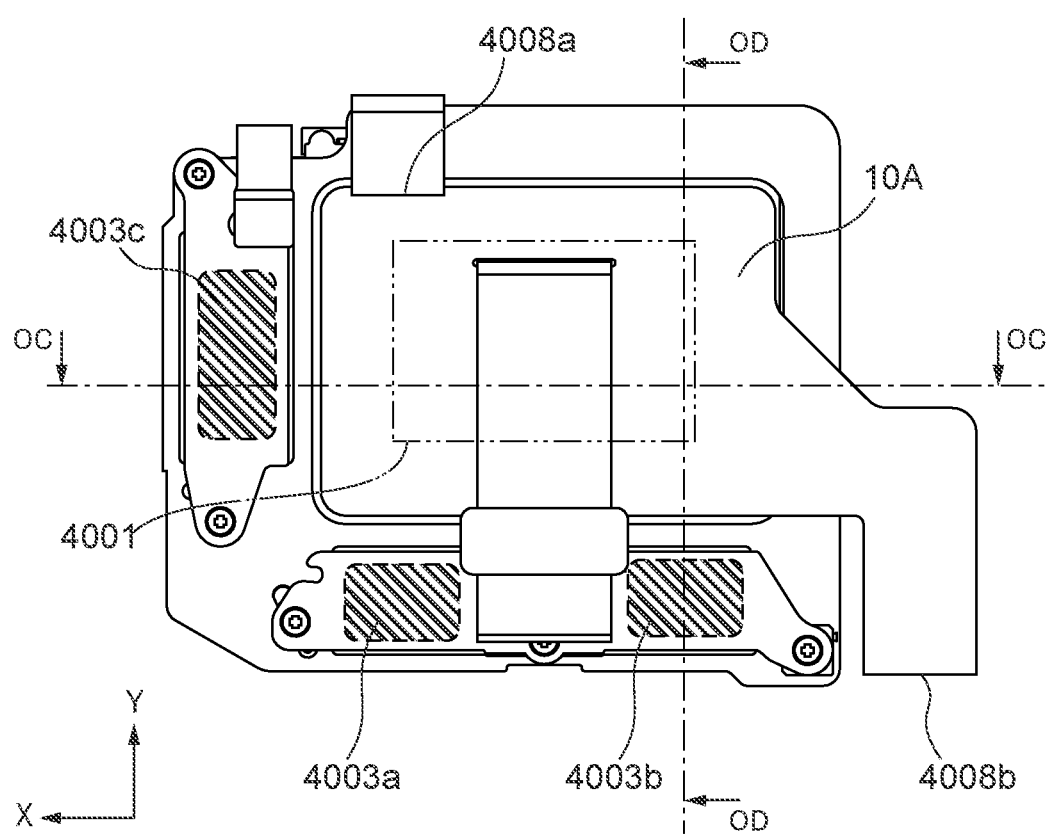
FIG. 18 is a view showing arrangement of the first duct in a second embodiment.

FIG. 18 is a schematic explanatory view showing the arrangement of the first duct 10A as viewed from the optical axis direction (Z-axis direction). When viewed from the optical axis direction (Z-axis direction), the first duct 10A is disposed in a position overlapping an image sensor 4001. The driving sections (the driving section 4003a, the driving section 4003b, and the driving section 4003c) are arranged such that the movable portions are enabled to move in the plurality of directions (translationally move in the X-axis direction and the Y-axis direction, and rotationally move about the Z-axis) according to the control operations performed with respective to the driving sections. To this end, in many cases, the driving sections are arranged along the periphery of the image sensor 4001. Note that reference numeral "4008 (specifically 4008a or 4008b)" in FIG. 18 denotes the connection portion between the first duct 10A and the second duct 12 (or the third duct 13).

Figure 19:
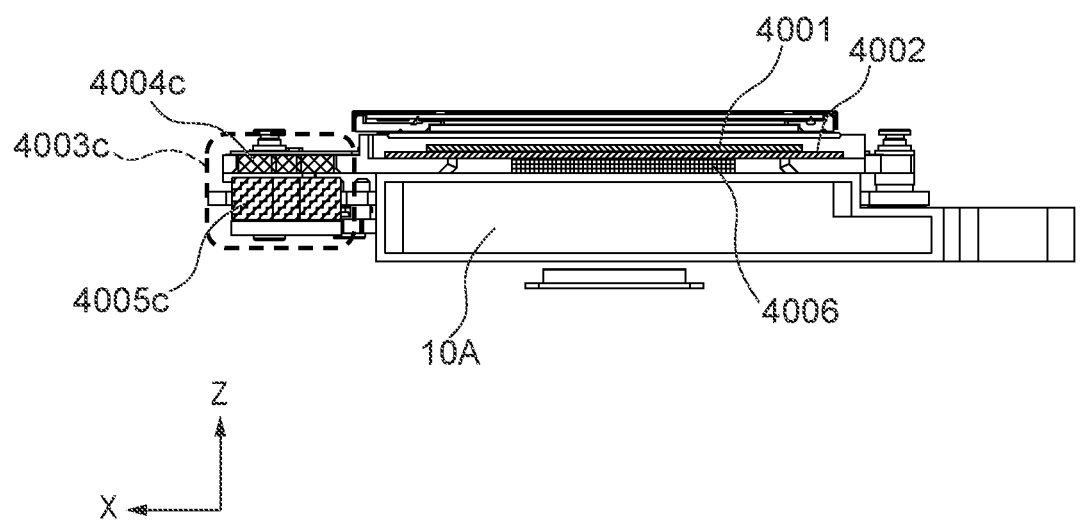
FIG. 19 is a cross-sectional view taken along OC-OC in FIG. 18.
Figure 20:
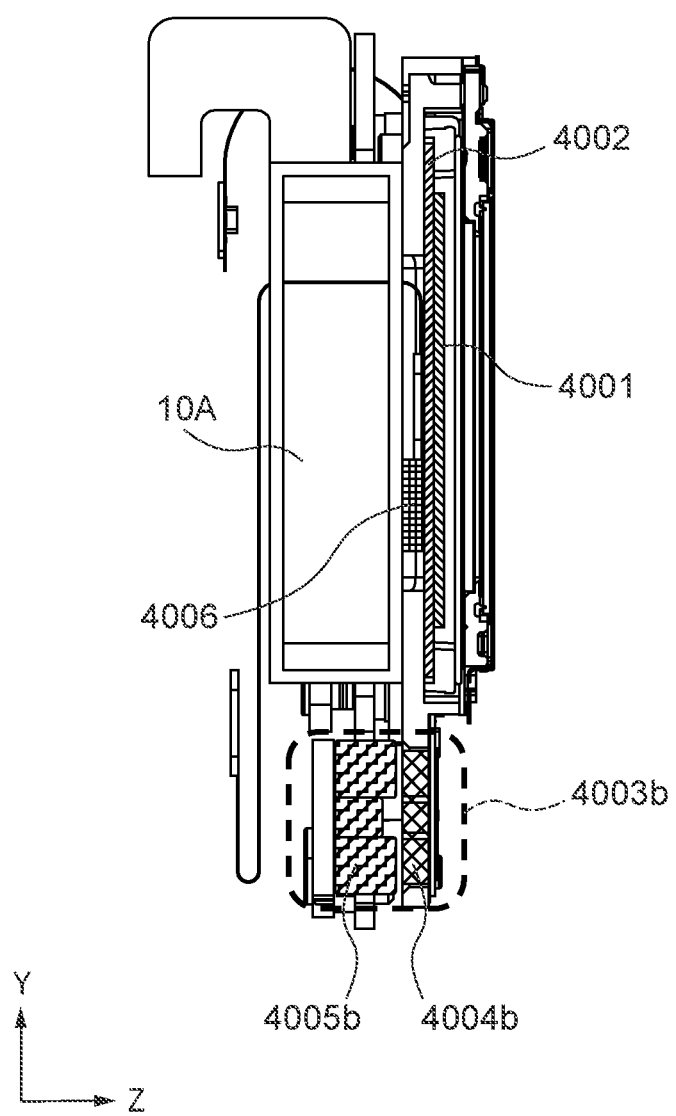
FIG. 20 is a cross-sectional view taken along OD-OD in FIG. 18.

FIG. 19 is a cross-sectional view taken along OC-OC in FIG. 18, and FIG. 20 is a cross-sectional view taken along OD-OD in FIG. 18, both of which are for explaining the arrangement of the first duct 10A in the respective directions (the X-axis direction and the Y-axis direction) perpendicular to the optical axis. As is clear from FIGS. 19 and 20, the first duct 10A and the magnets 4005 of the driving sections 4003 are arranged such that when viewed from the directions (the X-axis direction and the Y-axis direction) perpendicular to the optical axis direction, the first duct 10A overlaps the magnets in these directions. That is, the first duct 10A is disposed at a location overlapping the image sensor 4001 when viewed in the optical axis direction and overlapping the driving sections for moving the first duct 10A (image stabilization mechanism) in the directions perpendicular to the optical axis.

Figure 21:
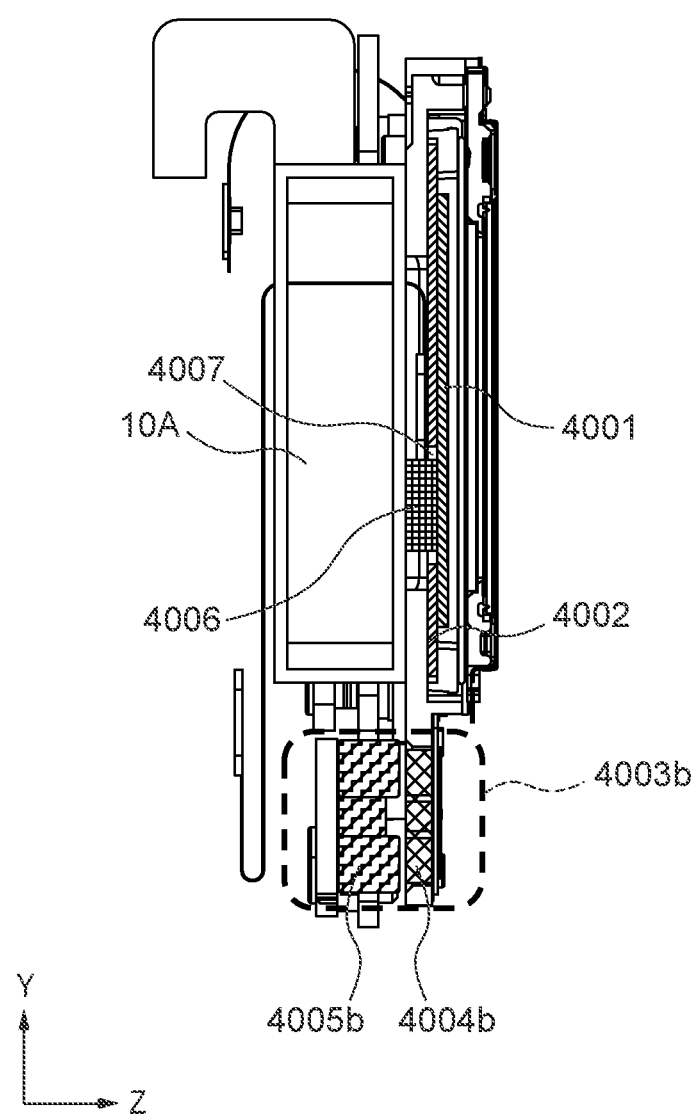
FIG. 21 is a view showing thermal connection between the first duct and an image sensor.

This makes it possible to dispose the first duct 10A in the vicinity of the image sensor 4001, and transfer heat generated in the image sensor 4001 to the first duct 10A along a simple route. For example, an image sensor board 4002 on which the image sensor 4001 is mounted and the first duct 10A may be connected via a member which is high in thermal conductivity, such as a heat dissipation rubber 4006. Further, as shown in FIG. 21, the member which is high in thermal conductivity, such as the heat dissipation rubber 4006, may be disposed in an opening 4007 formed in the image sensor board 4002 on which the image sensor 4001 is mounted, whereby the first duct 10A may be connected to the image sensor 4001 via the member. Thus, the first duct 10A is connected to a rear surface of the image sensor 4001 via the member which is high in thermal conductivity and is disposed in the opening 4007 formed in the image sensor board 4002 on which the image sensor 4001 is mounted.

Further, it is desirable that the connection portions where the first duct 10A (movable) is connected to the second duct 12 (fixed) and the third duct 13 (fixed), respectively, are arranged at locations where the connection portions do not overlap the image sensor 4001 when viewed from the optical axis direction (Z-axis direction). On the rear side of the image sensor 4001 in the optical axis direction (Z-axis direction), there are disposed a lot of components including the control circuit board 11 and the cooling fan 15 in an overlapping state. For this reason, by providing the connection portions 4008 at locations avoiding overlapping the image sensor 4001, it is possible to suppress increase in the size of the image capturing apparatus body 2 in the "−Z direction". That is, the first duct 10A is arranged at a location overlapping the image sensor 4001 when viewed in the optical axis direction and overlapping the driving sections of the image stabilization mechanism in the direction perpendicular to the optical axis. Further, the air flow passage in the first duct 10A and the second duct 12 is arranged in a position not overlapping the image sensor 4001 when viewed from the optical axis direction.

Figure 22:
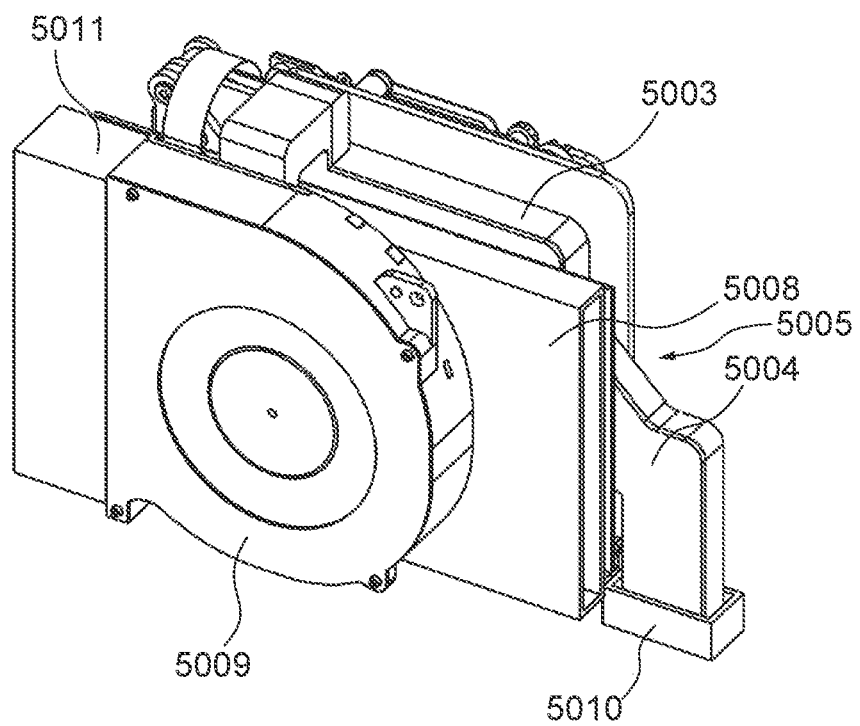
FIG. 22 is a perspective view showing a connection state from the image sensor to a cooling fan in a third embodiment.
Figure 23:
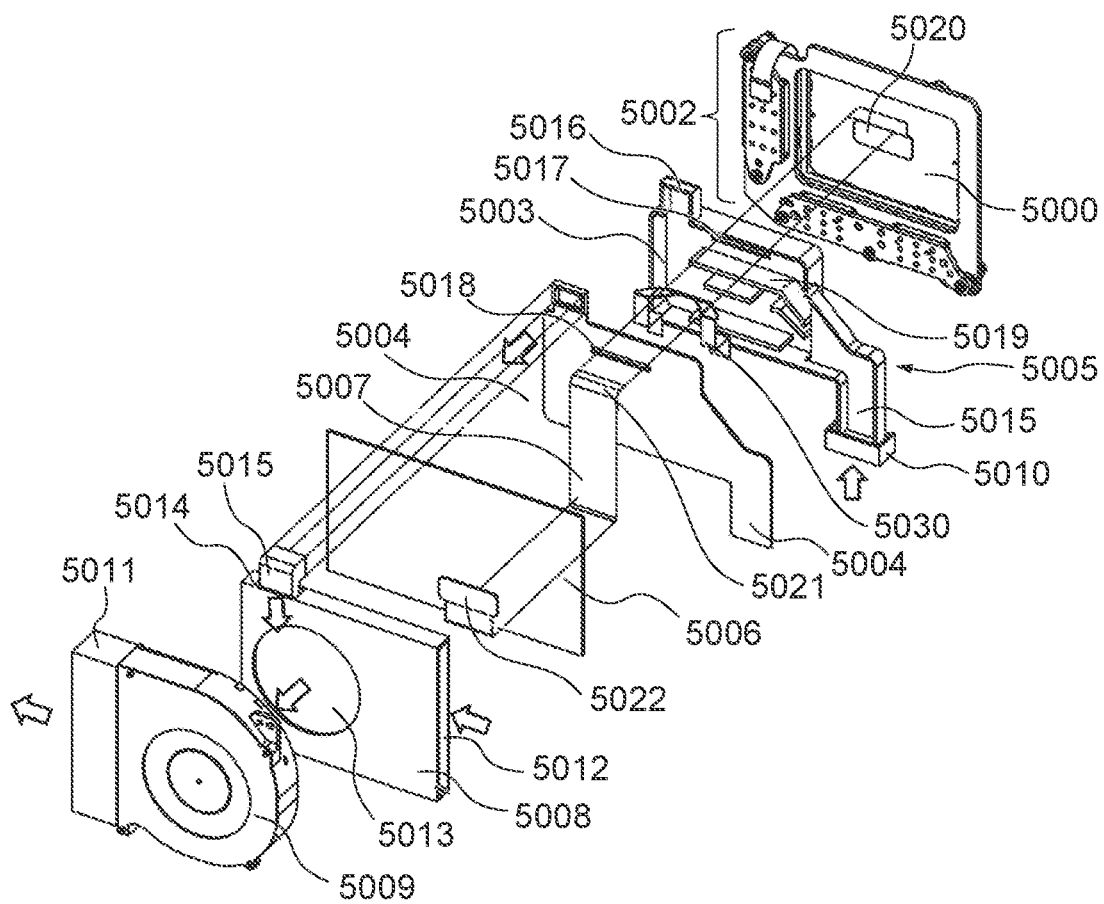
FIG. 23 is a developed perspective view of FIG. 22.
Figure 24:
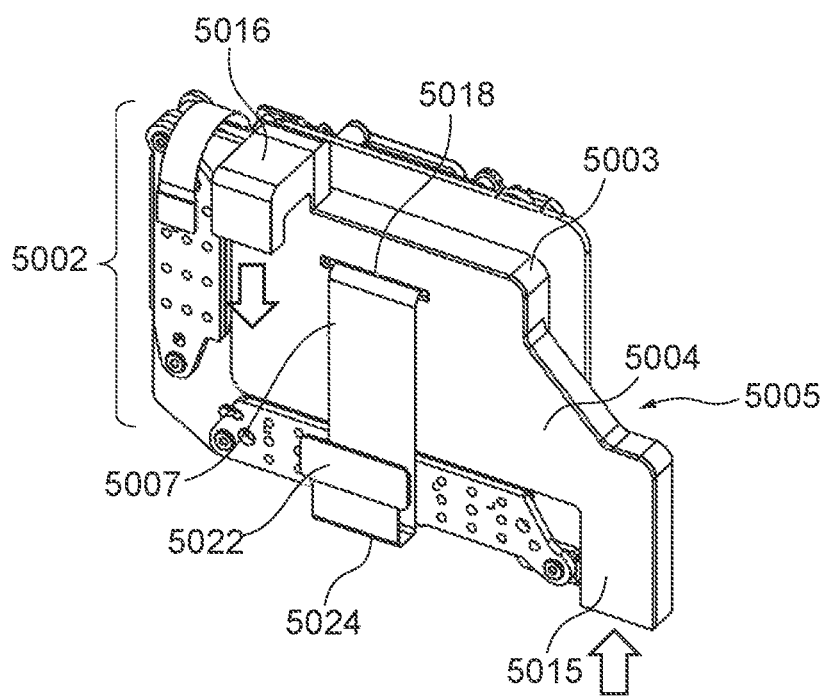
FIG. 24 is a perspective view showing a connection state from the image sensor to the first duct in the third embodiment.
Figure 25:
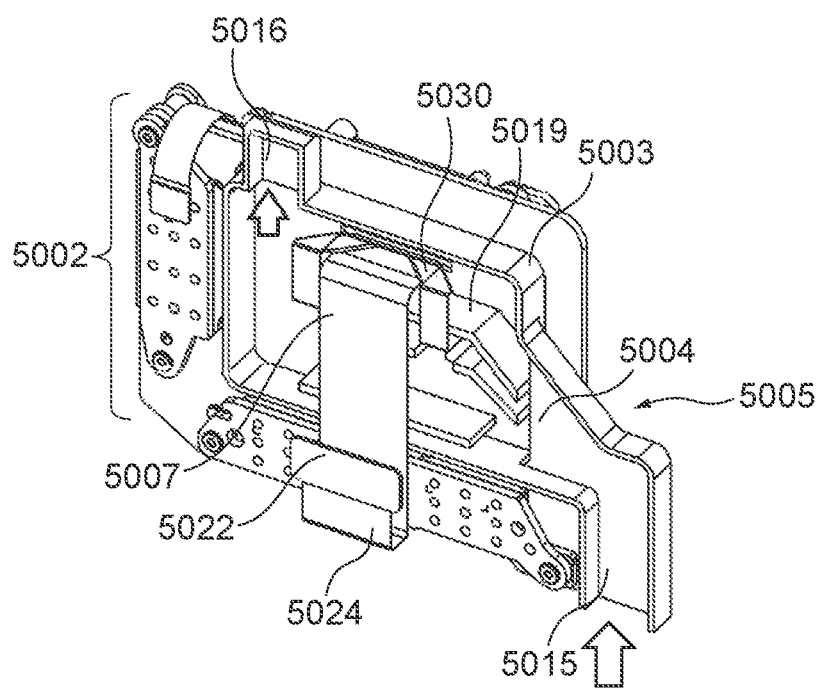
FIG. 25 is a perspective view showing a state in which a first duct cover has been removed from FIG. 24.
Figure 26:
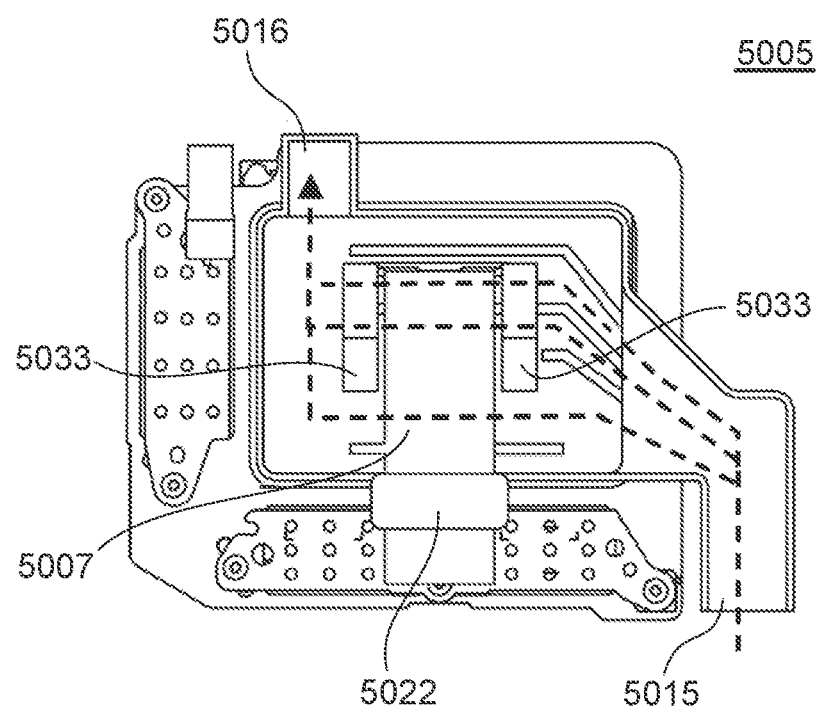
FIG. 26 is a front view showing the state in which the first duct cover has been removed from FIG. 24.
Figure 27A:
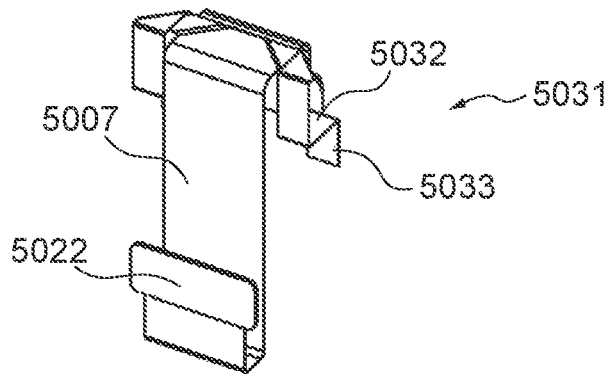
FIGS. 27A to 27C are perspective views each showing a form of a flexible wiring member and a heat dissipation sheet in the third embodiment.
Figure 27B:
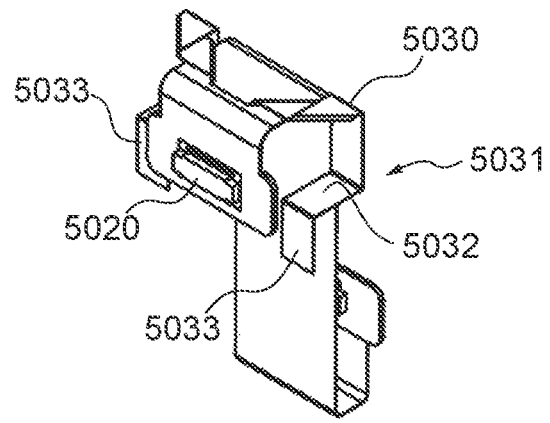
Figure 27C:
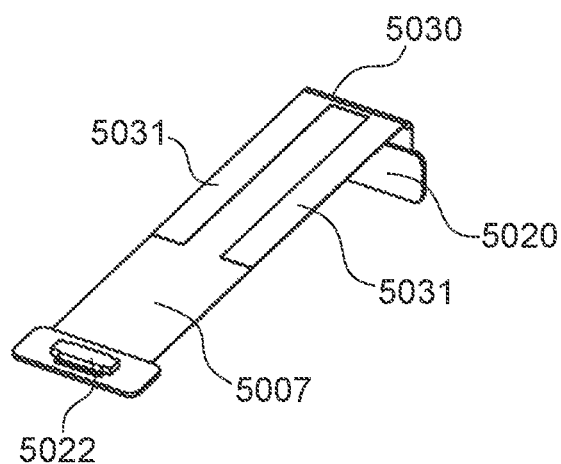
Figure 28A:
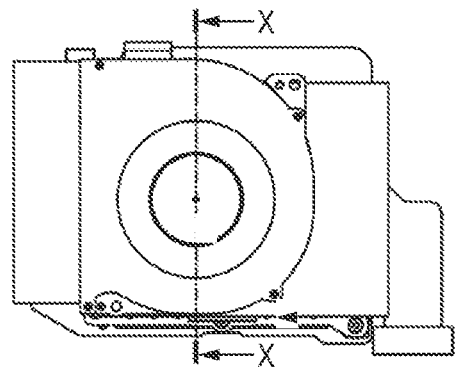
FIG. 28A is a rear view of FIG. 22.
Figure 28B:
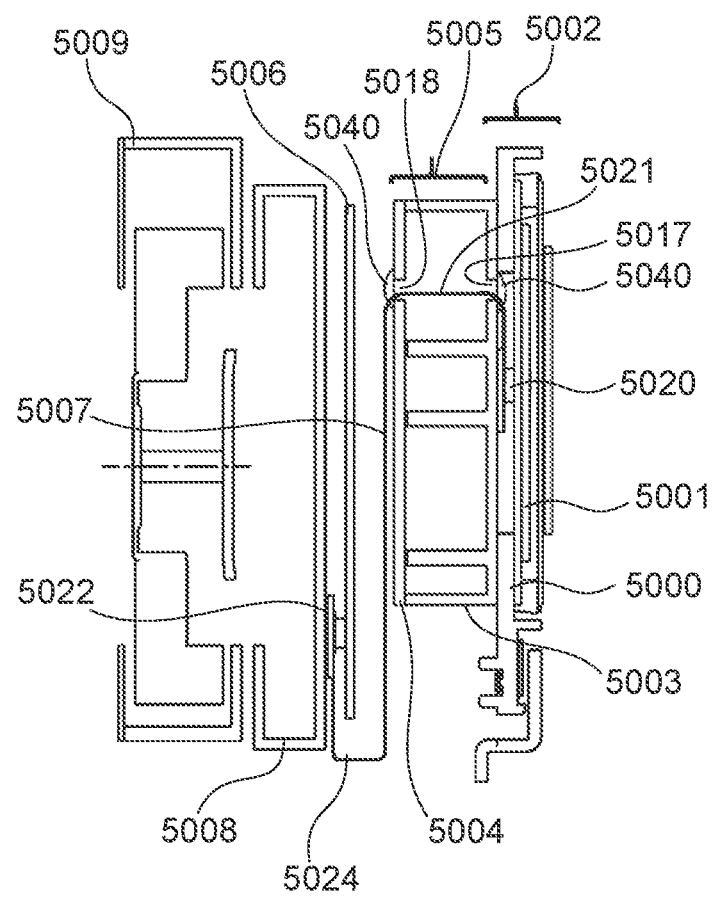
FIG. 28B is a cross-sectional view in a vertical direction, taken along X-X in FIG. 28A.

FIGS. 22 to 28B are views showing essential components of an image capturing apparatus according to a third embodiment of the present invention. FIG. 22 is a perspective view showing a connection state from an image sensor to a cooling fan in the third embodiment, and FIG. 23 is a developed perspective view of FIG. 22. FIG. 24 is a perspective view showing a connection state from the image sensor to a first duct, FIG. 25 is a perspective view showing a state in which a first duct cover is removed from the state shown in FIG. 24, and FIG. 26 is a front view showing a state in which the first duct cover is removed from the state shown in FIG. 24. Further, FIGS. 27A to 27C are perspective views each showing a form of a flexible wiring member and a heat dissipation sheet. FIG. 27A is a perspective view from the first duct, FIG. 27B is a perspective view from the image sensor board, and FIG. 27C is a perspective view of a state in which the flexible wiring member and the heat dissipation sheet are developed on the first duct side. Further, the FIG. 28A is a rear view of FIG. 22, and FIG. 28B is a cross-sectional view taken along X-X in a vertical direction in FIG. 28A.

Referring to FIG. 28B, reference numeral "5000" denotes the image sensor board, and the image sensor, denoted by reference numeral 5001, is mounted on the image sensor board 5000. Similar to the first embodiment, the image sensor board 5000 and the image sensor 5001 are driven for image stabilization by an image stabilization mechanism 5002 during photographing. As shown in FIG. 28B, to a surface of the image sensor board 5001, opposite to the surface on which the image sensor 5000 is mounted, a first duct body 5003 and a first duct cover 5004 for covering the first duct body 5003 are connected. With this, the first duct, denoted by reference numeral 5005, is formed which has an internal space formed inside. This first duct 5005 is driven for image stabilization by the image stabilization mechanism 5002 in unison with the image sensor board 5000 and the image sensor 5001.

A control circuit board 5006 fixed to a body fixing portion, not shown, is disposed on a first duct cover side of the first duct 5005, and is electrically connected to the image sensor board 5000 using the flexible wiring member, denoted by reference numeral 5007. On a side of the control circuit board 5006, opposite to a side toward the first duct 5005, a second duct 5008 connected to the control circuit board 5006 by a control circuit board connection portion 5022 (circuit board connection portion), and a cooling fan 5009 are fixedly arranged. Further, a third duct 5010 (see e.g. FIGS. 22 and 23) that is connected to the first inlet port 5 of the image capturing apparatus body 2, described in the first embodiment, and sucks air as indicated by an arrow in FIG. 24, and a fourth duct 5011 (see e.g. FIGS. 22 and 23) that discharges air are fixed to the body fixing portion, not shown.

Further, the second duct 5008 is formed with a second duct first inlet port 5012 connected to the second inlet port 6 (see e.g. FIG. 2) of the image capturing apparatus body 2, for introducing outside air sucked from the second inlet port 6 into the second duct 5008 as indicated by an arrow in FIG. 23, and a second duct first outlet port 5013 for discharging the introduced outside air into the cooling fan 5009 as indicated by an arrow in FIG. 23. With the arrangement described above, the cooling fan 5009 is rotated under the control of the control circuit board 5006. Then, a forced-cooling air flow passage is formed in which outside air is sucked in from the second duct first inlet port 5012 of the second duct 5008, which is connected to the second inlet port 6 of the image capturing apparatus body 2, and heat generated inside the image capturing apparatus is discharged from the fourth duct 5011 to the outside of the image capturing apparatus via the second duct first outlet port 5013 and the cooling fan 5009.

Further, as shown in FIG. 23, the second duct 5008 is formed with a second duct second inlet port 5014, which is connected to a first duct outlet port 5016 of the first duct cover 5004. Further, a first duct inlet port 5015 of the first duct 5005 is connected to the third duct 5010. The second duct second inlet port 5014 and the first duct outlet port 5016, and the first duct inlet port 5015 and the third duct 5010 are moved as the first duct 5005 is driven for image stabilization. These components are arranged with a clearance therebetween so as not to interfere and collide with each other when moved. When the cooling fan 5009 is driven for rotation, the outside air is sucked from the third duct 5010, and flows into the first duct 5005 (see e.g. FIG. 28B) from the first duct inlet port 5015. Then, the outside air flowing into the first duct 5005 is discharged through a forced-cooling air flow passage extending from the first duct outlet port 5016, through the second duct second inlet port 5014, the second duct 5008, and the second duct first outlet port 5013, to the forth duct 5011.

Then, the first duct 5005 has an insertion slit opening 5017 (insertion opening) formed in the first duct body 5003, and a take-out slit opening 5018 (take-out opening; see e.g. FIG. 24) formed in the first duct cover 5004. The flexible wiring member 5007 is configured such that it is inserted from the insertion slit opening 5017 formed in the first duct 5005 into the first duct 5005. Further, the flexible wiring member 5007 includes a penetrating portion 5021 which extends through the first duct from the insertion slit opening 5017 to the take-out slit opening 5018 and enables the flexible wiring member 5007 to be taken out from the take-out slit opening 5018 formed in the the first duct cover 5004, toward the control circuit board 5006. Then, the flexible wiring member 5007 is taken out from the take-out slit opening 5018 and is connected to the control circuit board 5006 using the control board connection portion 5022. Thus, the image sensor 5001 and the control circuit board 5006 are connected by the flexible wiring member 5007.

A linking portion (continuous portion) 5024 (see e.g. FIG. 24) of the flexible wiring member 5007 extends, from the penetrating portion 5021 taken out via the take-out slit opening 5018, to below the bottom of the control circuit board 5006, and makes a U-turn upward round a lower end of the control circuit board 5006. Then, the control board connection portion 5022 is connected to the control circuit board 5006. With this, even when the image sensor 5001, the image sensor board 5000 and the first duct 5005 are driven to move in unison for image stabilization by the image stabilization mechanism 5002, the movement in the vertical direction is absorbed by the moving displacement of the U-turn portion of the linking portion 5024. Further, the movement in the left-right direction is absorbed by the distortion displacement of part extending from the penetrating portion 5021 to the U-turn portion. The linking portion 5024 has a sufficient length of extension, which also contributes to reduction of load applied by the distortion displacement of the U-turn portion.

Thus, the load applied to the flexible wiring member 5007 is reduced by the linking portion 5024 and prevented from adversely affecting the image stabilization mechanism. As shown in FIG. 28B, after assembling the flexible wiring member 5007 to the image sensor board 5000, the first duct 5005, and the control board connection portion 5022, the insertion slit opening 5017 and the take-out slit opening 5018 are closed with filler 5040 to reduce loss of flow of air.

As described above, the flexible wiring member 5007 is inserted from the insertion slit opening 5017 formed in the first duct 5005 into this duct. Then, by using the penetrating portion 5021, the flexible wiring member 5007 is taken out from the take-out slit opening 5018 formed in the first duct cover 5004 toward the control circuit board 5006. Then, the flexible wiring member 5007 is connected to the control circuit board 5006 using the control board connection portion 5022. Further, the linking portion 5024 (continuous portion) extending from the penetrating portion 5021 to the control board connection portion 5022 absorbs the movement of the image sensor board. Further, the flexible wiring member 5007 is forcedly cooled by the cooling fan 5009 in the first duct 5005.

The flexible wiring member 5007 has its signal line portion and ground wired by a copper wiring pattern, and heat generated in the image sensor 5001 during operation is transferred from the image sensor board 5000 along the copper wiring pattern of the flexible wiring member 5007, so that the temperature of the flexible wiring member 5007 itself rises. Outside air sucked from the first duct inlet port 5015 into the first duct 5005 (see e.g. FIG. 23) and flowing to the first duct outlet port 5016 (see e.g. FIG. 25) passes between guide ribs 5019 (see e.g. FIG. 23) of the first duct body 5003. As a result, air flows as indicated by broken line arrows in FIG. 26. Then, the air contacts the surface of the penetrating portion 5021, and hence heat is dissipated from the flexible wiring member 5007 to the air.

Further, at this time, the air is caused to flow substantially parallel to the sheet surface of the penetrating portion 5021 of the flexible wiring member 5007 by the guide ribs 5019, and hence the flow of air is prevented from being obstructed by the penetrating portion 5021. Thus, it is possible to reduce heat transferred from the flexible wiring member 5007 to the control circuit board 5006 and thereby suppress temperature rise of the control circuit board 5006. Further, as shown in FIGS. 27A to 27C, the flexible wiring member 5007 is arranged such that it is overlaid on a heat dissipation sheet 5030 at an image sensor board connection portion 5020, whereby heat generated by the flexible wiring member 5007 is transferred to the heat dissipation sheet 5030.

The flexible wiring member 5007 and the heat dissipation sheet 5030 are inserted from the insertion slit opening 5017 of the first duct body 5003 into the first duct 5005, and then a bifurcated heat dissipation sheet end portion 5031 (see FIG. 27C) is folded. Therefore, the heat dissipation sheet 5030 extends, separating from the flexible wiring member 5007, into a state no longer overlaid thereon, and a passage of air flowing between the guide ribs 5019 in the first duct 5005 (see e.g. FIG. 28B) is formed as follows: As shown in FIG. 27A, heat dissipation sheet air contact portions 5032 ("air contact portion" is a portion which contacts air) having sheet surfaces substantially parallel to a direction of air flow and heat dissipation sheet fixed portions 5033 which are brought into contact with and fixed to an inner wall of the first duct 5005 (see FIG. 28B) are formed. In this state, heat is dissipated from the surfaces of the heat dissipation sheet air contact portions 5032 of the heat dissipation sheet 5030 to the air flowing in the first duct 5005, and heat is also dissipated from the heat dissipation sheet fixed portions 5033 by the contact with the first duct 5005. This also suppresses temperature rise of the flexible wiring member 5007.

As described above, the flexible wiring member 5007 has a sheet-like shape, and the surface of the sheet-like shape is arranged substantially parallel to the direction of air flow in the first duct. Further, the heat dissipation sheet 5030 having a high thermal conductivity can be inserted from the insertion slit opening 5017 together with the flexible wiring member 5007. Then, in the first duct 5005, the heat dissipation sheet air contact portions 5032, where the sheet surface of the heat dissipation sheet 5030 is arranged substantially parallel to the direction of air flow, are cooled by the cooling fan. Further, the insertion slit opening 5017 into which the flexible wiring member 5007 is inserted and the take-out slit opening 5018 from which the flexible wiring member 5007 is taken out can be sealed.

Figure 29:
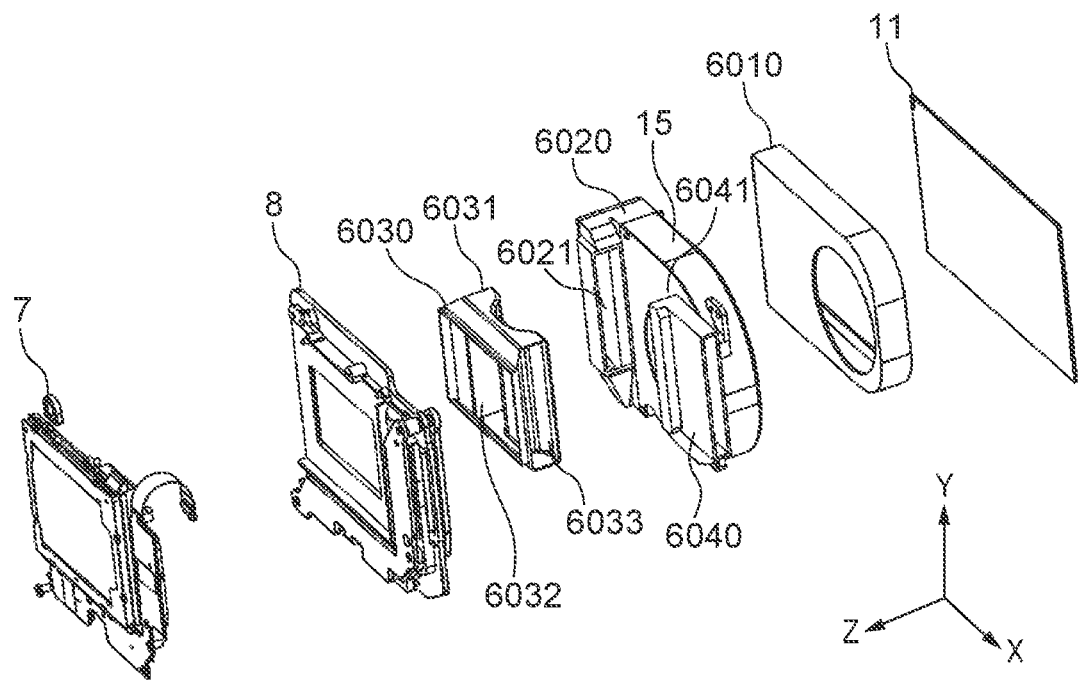
FIG. 29 is an exploded perspective view showing duct arrangement of a fourth embodiment.

FIG. 29 is an exploded perspective view showing duct arrangement as essential part of an image capturing apparatus according to a fourth embodiment of the present invention. Note that a first exhaust duct and a second exhaust duct appearing in FIG. 29 correspond to the above-described first duct 10 and second duct 12, respectively. In the fourth embodiment, an air flow passage is formed by an intake duct 6010, the cooling fan 15, a first exhaust duct 6020, a flexible member 6030, and a second exhaust duct 6040 which are sealed from the outside. The intake duct 6010 is connected to the first inlet port 5 (see e.g. FIG. 2), not shown in FIG. 29, to suck outside air into the image capturing apparatus body 2. Further, the intake duct 6010 is disposed close to the control circuit board 11 and is capable of cooling the control circuit board 11. The cooling fan 15 is driven for rotation, thereby being capable of generating a current of air in the air flow passage.

The first exhaust duct 6020, the flexible member 6030, and the second exhaust duct 6040 are united to form an exhaust duct. More specifically, an opening 6021 and an opening 6031 are connected and sealed, and an opening 6033 and an opening 6041 are connected and sealed to form an air flow passage. The flexible member 6030 is a member having flexibility, such as vinyl which is small in elasticity. The flexible member 6030 is formed with an image sensor-side opening 6032, which is connected to a surface of the image sensor unit 7, opposite to a light receiving surface of the same.

The second exhaust duct 6040 is connected to the first outlet port 4 (see e.g. FIG. 1) with e.g. an adhesive material, not shown. The adhesive material (material having adhesiveness), not shown, is preferably an adhesive or a double-sided tape having high thermal conductivity. An outer peripheral surface of the flexible member 6030 may be connected to the image sensor unit 7 without providing the image sensor-side opening 6032. Further, when the image sensor unit 7 is moved for image stabilization, since the flexible member 6030 has flexibility, the image sensor-side opening 6032 can be moved in unison with the image sensor unit 7.

Further, since the elasticity of the flexible member 6030 is small, it is only required to cause a small amount of current to flow through a circuit for driving the image sensor unit 7, and hence it is also possible to reduce the size and weight of the circuit for driving the image sensor unit 7 and associated members therearound. Further, the flexible member 6030 has sufficient deflection between the opening 6031, the image sensor-side opening 6032, and the opening 6033. With this, all portions of the flexible member 603 are flexibly moved when the image sensor unit 7 is moved, and hence this increases the degree of freedom of a movable range of the image sensor unit 7.

Here, when attention is directed to the members forming the above-described air flow passage, the flexible member 6030 is arranged on the exhaust side of the cooling fan 15. With this, a space within the flexible member 6030 is under positive pressure, so that it is possible to form the passage without causing shrinkage of the flexible member 6030. Note that the shape of the flexible member 6030 is not limited to the example shown in FIG. 29, but any other suitable shape may be employed insofar as it enables connection, with sufficient deflection, between the opening 6031, the image sensor-side opening 6032, and the opening 6033.

From the above, at least part of the first exhaust duct 6020 can be formed by the flexible member 6030, and at least part of the image sensor board can be thermally connected to the flexible member 6030. Further, the cooling fan is connected to the second exhaust duct 6040, and the flexible member 6030 may be connected to the exhaust side of the cooling fan 15. Further, the flexible member 6030 has the image sensor-side opening (opening) 6032 having a predetermined size, and this image sensor-side opening (opening) 6032 is connected preferably such that it covers a surface of the image sensor, opposite to a light receiving surface of the same.

Further, the flexible member 6030 is deformed in accordance with the movement of the image sensor board within the movable range of the image sensor board. Further, inside the flexible member 6030, heat dissipation fins can be arranged on a surface of the image sensor board, opposite to the light receiving surface of the same. Note that the flexible member 6030 is e.g. a vinyl material.

Figure 30:
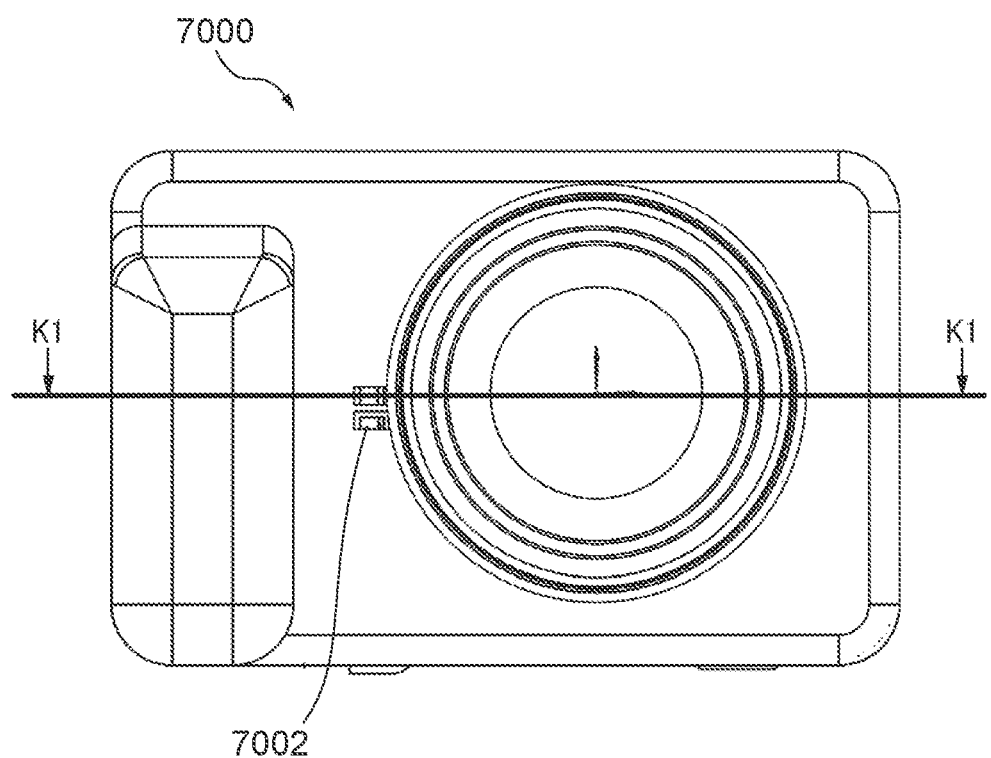
FIG. 30 is a front view of an image capturing apparatus.

Next, the outline of the essential components of an image capturing apparatus according to a fifth embodiment will be described with reference to FIGS. 30 and 31. The image capturing apparatus according to the fifth embodiment differs from that according to the first embodiment in a duct thermally connected to the image capturing section (image sensor) and an inlet port. On the other hand, the cooling of the control circuit board and the image stabilization mechanism are the same as those of the first embodiment, and hence description of the same portions is omitted.

The outline of internal components arranged within the image capturing apparatus, denoted by reference numeral 7000, will be described with reference to FIGS. 30 and 31. FIG. 30 is a front view of the image capturing apparatus 7000, and FIG. 31 is a cross-sectional view taken along K1-K1 in FIG. 30. As shown in FIG. 30, the image capturing apparatus 7000 is provided with an inlet port 7002 for sucking outside air into a fifth duct 7001, described hereinafter.

Figure 31:
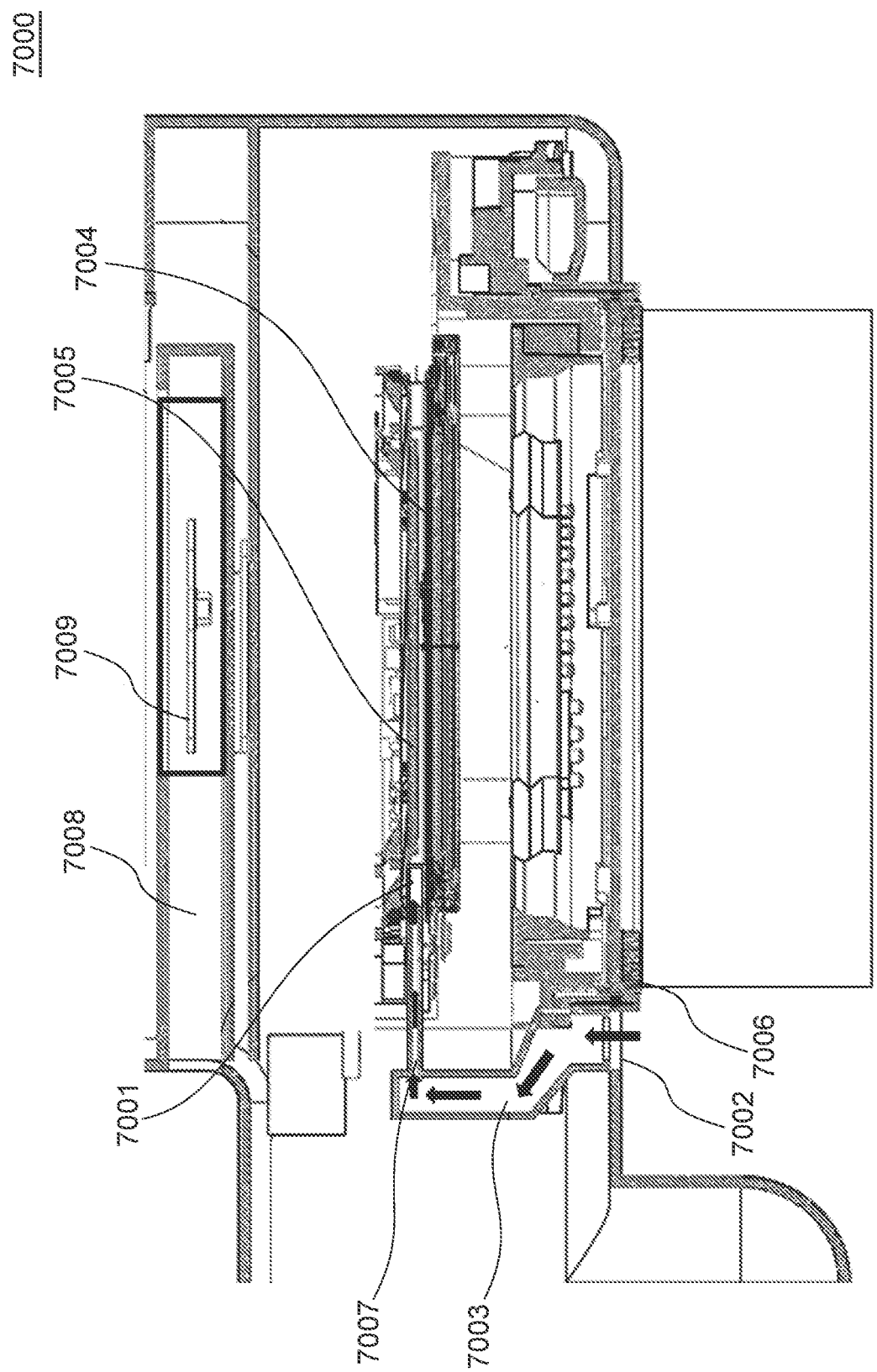
FIG. 31 is a cross-sectional view of the image capturing apparatus, taken along K1-K1 in FIG. 30.

As shown in FIG. 31, in the image capturing apparatus 7000, there is arranged a seventh duct 7003 that is connected to the inlet port 7002 and is fixed inside the image capturing apparatus 7000. Further, an image sensor board 7005 on which an image sensor 7004 is mounted has the image stabilization mechanism provided to correct a camera shake, and can be moved (is movable) with respect to the image capturing apparatus 7000. The image stabilization mechanism is a known mechanism, and hence description thereof is omitted. The image sensor board 7005 is fixed in the image capturing apparatus 7000 and is movable together with the image sensor 7004. Further, the fifth duct 7001 that is movable together with the image sensor board 7005 is arranged between a mount 7006 and the image sensor board 7005 and is fixed to the image sensor board 7005.

Further, there is provided an eighth duct 7007 that connects between the fifth duct 7001 and the seventh duct 7003. The eighth duct 7007 is an elastic member. This reduces mechanical stress generated between the seventh duct 7003 that is fixed to the image capturing apparatus 7000 and the fifth duct 7001 that is fixed to the image sensor board 7005 and is movable with respect to the image capturing apparatus 7000. Further, the seventh duct 7003 is disposed on a side surface of a shutter or an ND unit, which is arranged between the image sensor board 7005 and the mount 7006. Further, a sixth duct 7008 is thermally connected to the control circuit board, not shown. On the control circuit board, there are mounted, for example, a CPU, a memory, and other electronic components. Further, the fifth duct 7001 may have one end connected to the eight duct 7007 which is the elastic member, and the other end connected to a duct, not shown, which is an elastic member. In short, both ends of the fifth duct may be connected to the ducts which are the elastic members.

Further, arrows indicated in FIG. 31 show a flow of air, in which outside air is sucked in from the inlet port 7002, and the sucked air flows into the fifth duct 7001 through the seventh duct 7003 and the eighth duct 7007. The air is warmed by heat generated by a sensor and the like, and heated air is discharged to the outside by driving a cooling fan 7009, for rotation, which is connected to the sixth duct 7008.

As described above, the seventh duct 7003, the eighth duct 7007, and the fifth duct 7001 are arranged between the mount 7006 and the image sensor 7004, and forced cooling is performed by driving the cooling fan 7009 for rotation. This makes it possible to effectively cool the image sensor 7004, and reduce the size of the product.

Figure 32:
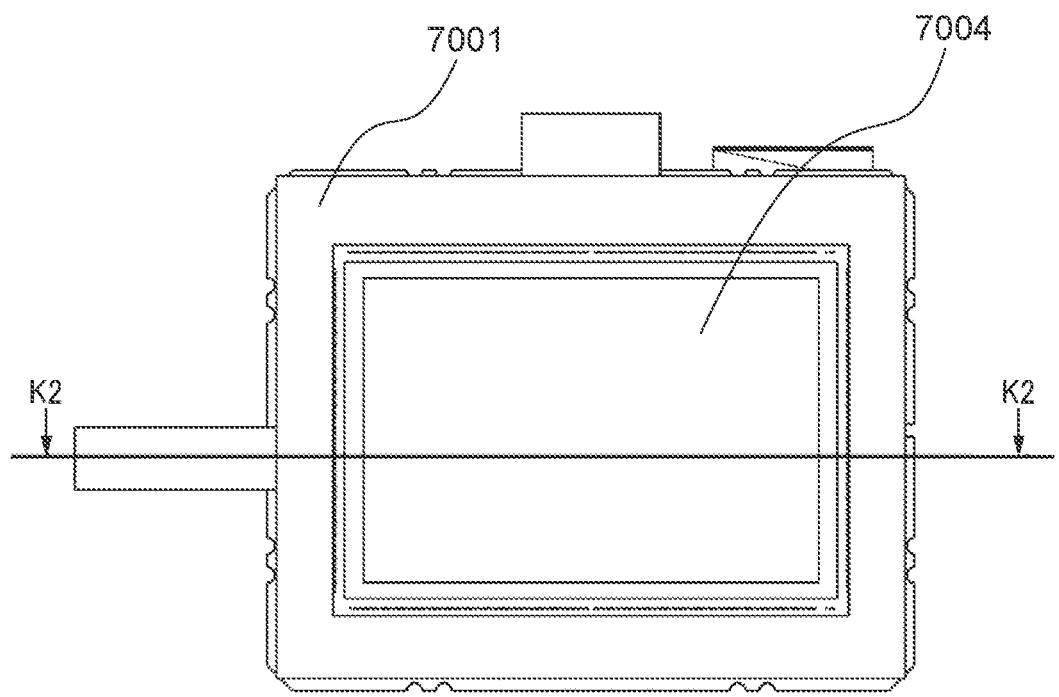
FIG. 32 is a front view of a fifth duct.
Figure 33:
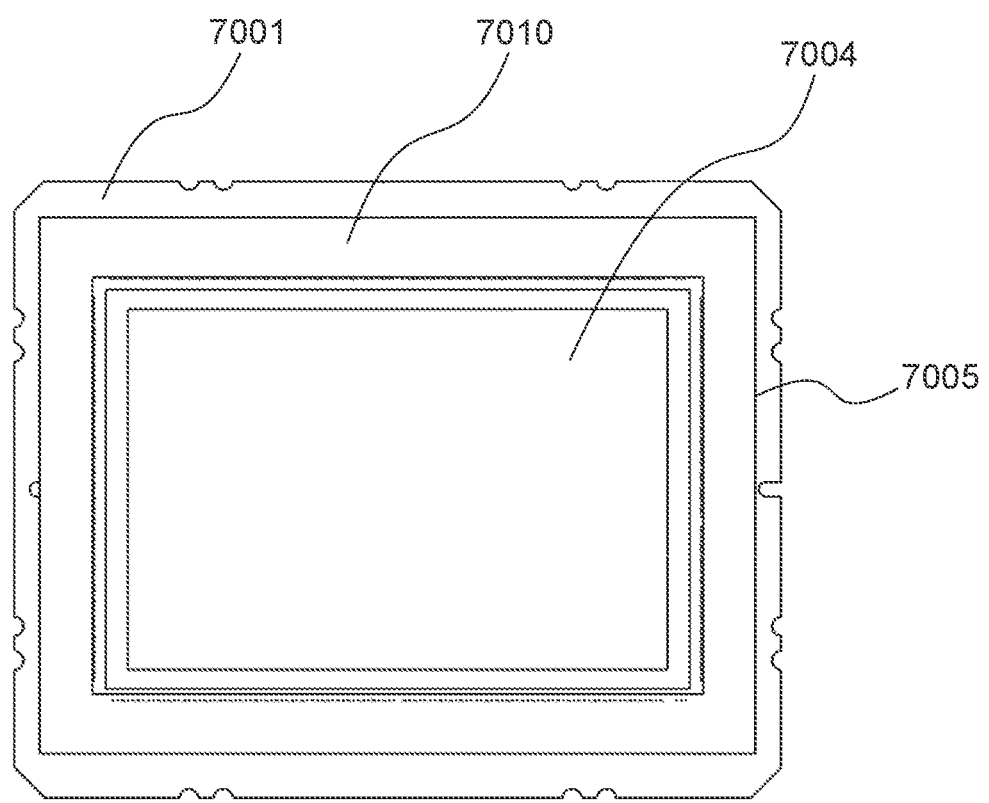
FIG. 33 is a front view of an image sensor board.

Next, the structure of the fifth duct 7001 and the image sensor board 7005 will be described with reference to FIGS. 32, 33, and 34. FIG. 32 is a front view of the image sensor 7004, the fifth duct 7001, and the image sensor board 7005, and FIG. 33 is a view showing a state in which the fifth duct 7001 appearing in FIG. 32 is partially hidden. As shown in FIG. 32, the fifth duct 7001 surrounds the periphery of the image sensor 7004. Also in the thickness direction of the image sensor, air tight sealing is provided between the fifth duct 7001 and the image sensor board 7005. Air tight sealing is also provided between the fifth duct 7001 and the shutter or the ND unit, and between the image sensor 7004 and the mount 7006. Therefore, dust or the like is prevented from entering the image sensor 7004 from the inside of the image capturing apparatus 7000.

As shown in FIG. 33, the image sensor 7004 is mounted on the image sensor board 7005, and a copper foil exposed portion 7010 is arranged on the surface of the image sensor board 7005, around the image sensor 7004. Heat generated by the image sensor 7004 is transferred to the image sensor board 7005. Therefore, by blowing cooled air against the copper foil exposed portion 7010 arranged on the surface of the image sensor board 7005, it is possible to cool the image sensor board 7005 and thereby effectively cool the image sensor 7004.

Thus, it is possible to obtain an arrangement in which the heat dissipation section is disposed on a side, toward the mount 7006, of the image sensor board 7005, with at least part of the heat dissipation section being connected to the fifth duct 7001 (first duct), and the heat dissipation section is disposed on the outer periphery of the image sensor 7004.

Figure 34:
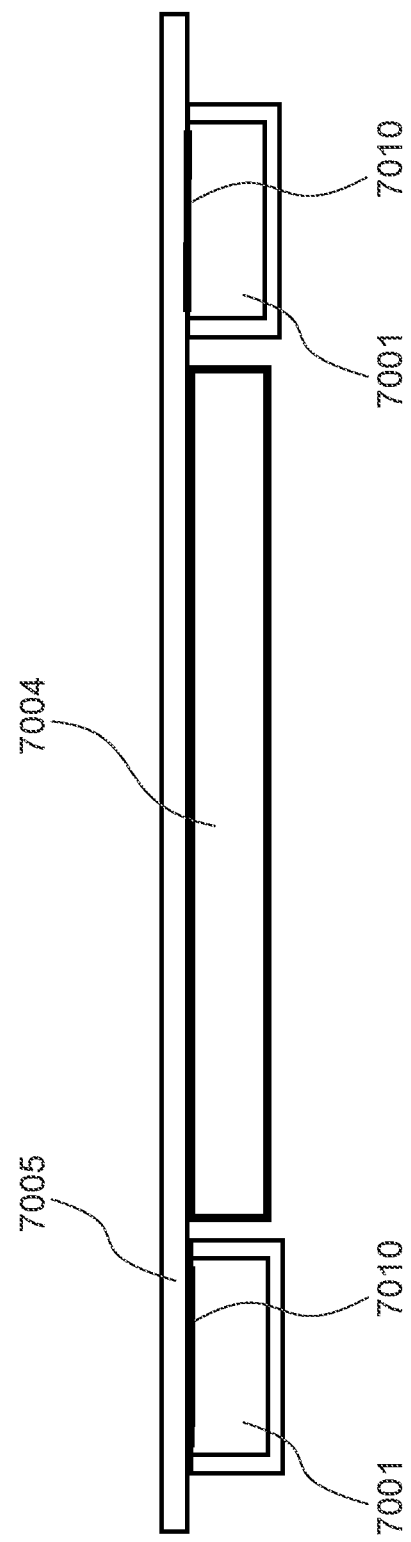
FIG. 34 is a cross-sectional view taken along K2-K2 in FIG. 32.

FIG. 34 is a cross-sectional view taken along K2-K2 in FIG. 32. As shown in FIG. 34, a surface of the fifth duct 7001, which is in contact with the image sensor board 7005, is open, and it is possible to directly blow air against the image sensor board 7005. As described above, the fifth duct 7001 prevents dust or the like from entering the image sensor 7004, and the surface, toward the image sensor board 7005, of the fifth duct 7001, is open. This makes it possible to directly blow air against the copper foil exposed portion 7010, and hence it is possible to effectively cool the image sensor 7004. Further, this makes it possible to reduce the size of the product.

Note that the fifth duct 7001, the sixth duct 7008, the seventh duct 7003, and the eighth duct 7007 in the fifth embodiment are sometimes described as the "first duct" to the "fourth duct" in the appended claims, respectively. However, these are different from the "first duct" to the "fourth duct" in the first to fourth embodiments.

As described above, the image capturing apparatus in the embodiments of the present invention has the following arrangement: The image capturing apparatus includes the image sensor board 16 on which the image sensor is mounted, the image stabilization mechanism which performs image stabilization by moving the image sensor board 16, the first duct 10 which has an air flow passage and is movable, and the second duct 12 which has an air flow passage and is fixedly disposed and connected to the first duct 10. Further, the image capturing apparatus includes the cooling fan 15 for causing outside air to flow through the first duct 10 and the second duct 12. Further, the image sensor board 16 is held on the first duct 10.

Further, the other aspect of the present invention has the following arrangements: The image capturing apparatus includes the image sensor board 7005 on which the image sensor is mounted, the image stabilization mechanism which performs image stabilization by moving the image sensor board 7005, and the fifth duct 7001 (first duct) having an air flow passage and fixedly disposed between the image sensor board 7005 and the mount 7006. Further, the image capturing apparatus includes the sixth duct 7008 (second duct) having an air flow passage and thermally connected to the control circuit board, and the cooling fan 7009 having an air flow passage and connected to the sixth duct 7008 (second duct), for discharging air heated in the apparatus.

Further, the image capturing apparatus includes the seventh duct 7003 (third duct) which has an air flow passage connected to the inlet port 7002 and is fixed. Further, the image capturing apparatus includes the eighth duct 7007 (fourth duct) having an air flow passage and connected to the fifth duct 7001 (first duct) and the seventh duct 7003 (third duct). Further, the seventh duct 7003 (third duct) is disposed on the side of the shutter or the ND unit arranged between the image sensor board and the mount.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-064066 filed Apr. 7, 2022, which is hereby incorporated by reference herein in its entirety.

What is claimed is:

1. An image capturing apparatus comprising:
an image sensor board on which an image sensor is mounted;
an image stabilization mechanism which performs image stabilization by moving the image sensor board;
a first duct which has an air flow passage and is movable;
a second duct which has an air flow passage, and is fixed and connected to the first duct; and
a cooling fan for causing outside air to flow through the first duct and the second duct,
wherein the image sensor board is held on the first duct.

2. The image capturing apparatus according to claim 1, wherein when connecting the first duct and the second duct, an outer side of one of the first duct and the second duct is disposed inside the other of the first duct and the second duct with a predetermined spacing length and a predetermined overlap length, and
wherein the predetermined spacing length and the predetermined overlap length are longer than the maximum movable length of the first duct.

3. The image capturing apparatus according to claim 1, wherein the first duct and the second duct are connected by a thin connection member having flexibility, and
wherein the thin connection member extends longer than the maximum length of the movable distance of the first duct.

4. The image capturing apparatus according to claim 1, wherein the first duct and the second duct are connected by an extendable/contractable member.

5. The image capturing apparatus according to claim 4, wherein the extendable/contractable member extends and contracts in a direction perpendicular to an optical axis direction in accordance with movement of the first duct.

6. The image capturing apparatus according to claim 5, wherein the extendable/contractable member is formed of a material having high thermal conductivity.

7. The image capturing apparatus according to claim 6, wherein the extendable/contractable member is a bellows member.

8. The image capturing apparatus according to claim 1, wherein the first duct is disposed in a position overlapping the image sensor as viewed from an optical axis direction, and overlapping a driving section for moving the first duct in a direction perpendicular to the optical axis direction, and
wherein an air flow passage in the first duct and the second duct is arranged in a position not overlapping the image sensor as viewed from the optical axis direction.

9. The image capturing apparatus according to claim 1, wherein the first duct is connected to a rear surface of the image sensor via a member having high thermal conductivity, in an opening formed in the image sensor board on which the image sensor is mounted.

10. The image capturing apparatus according to claim 1, wherein the first duct includes:
an insertion opening which enables a flexible wiring member to enter the first duct, and
a take-out opening which enables the flexible wiring member to be taken out from the first duct, and
wherein the flexible wiring member includes:
a penetrating portion which extends through the first duct from the insertion opening to the take-out opening, and
a circuit connection portion for connecting the flexible wiring member taken out from the take-out opening to a control circuit board.

11. The image capturing apparatus according to claim 10, wherein the flexible wiring member further includes a continuous portion that extends from the penetrating portion to the circuit connection portion and absorbs movement of the image sensor board, and
wherein the flexible wiring member connected to the circuit connection portion is cooled in the first duct by the cooling fan.

12. The image capturing apparatus according to claim 10, wherein the flexible wiring member has a sheet-like shape, and
wherein a surface of the sheet-like shape is arranged in the first duct such that the surface of the sheet-like shape is substantially parallel to a direction of air flow.

13. The image capturing apparatus according to claim 10, wherein the image capturing apparatus is configured such that a heat dissipation sheet having high thermal conductivity can be inserted from the insertion opening, together with the flexible wiring member, and
wherein the heat dissipation sheet includes an air contact portion which is arranged in the first duct, substantially parallel to a direction of air flow, for contact with air flowing through the first duct, thereby being cooled by the cooling fan.

14. The image capturing apparatus according to claim 10, wherein the insertion opening and the take-out opening are sealed.

15. The image capturing apparatus according to claim 1, wherein at least part of the first duct is formed by a flexible member, and at least part of the image sensor board is thermally connected to the flexible member.

16. The image capturing apparatus according to claim 15, wherein the cooling fan is connected to the second duct, and the flexible member is connected to an exhaust side of the cooling fan.

17. The image capturing apparatus according to claim 15, wherein the flexible member has an opening having a predetermined size, and
wherein the opening is provided such that the opening covers a surface of the image sensor, opposite to a light receiving surface of the image sensor.

18. The image capturing apparatus according to claim 15, wherein the flexible member is deformed in accordance with movement of the image sensor board within a movable range of the image sensor board.

19. The image capturing apparatus according to claim 15, wherein heat dissipation fins are disposed inside the flexible member, on a surface of the image sensor board, opposite to a light receiving surface of the image sensor board.

20. The image capturing apparatus according to claim 15, wherein the flexible member is a vinyl material.

21. The image capturing apparatus according to claim 15, wherein the flexible member is connected to the image sensor board with an adhesive material.

22. An image capturing apparatus comprising:
an image sensor board on which an image sensor is mounted;
an image stabilization mechanism which performs image stabilization by moving the image sensor board;
a first duct which has an air flow passage and is fixedly disposed between the image sensor board and a mount;
a second duct which has an air flow passage and is thermally connected to a control circuit board;
a cooling fan that is connected to the second duct so as to discharge air heated in the image capturing apparatus;
a third duct which has an air flow passage, and is connected to an inlet port and fixed; and a fourth duct which has an air flow passage and is connected to the first duct and the third duct, wherein the third duct is disposed on a side surface of a shutter or an ND unit, which is arranged between the image sensor board and the mount.

23. The image capturing apparatus according to claim 22, wherein the fourth duct is an elastic member.

24. The image capturing apparatus according to claim 22, wherein the first duct has opposite ends each connected to a duct which is an elastic member, and wherein an end of the third duct, opposite to the fourth duct, is provided with the inlet port.

25. The image capturing apparatus according to claim 22, wherein a heat dissipation section is disposed on a mount side of the image sensor board, and at least part of the heat dissipation section is connected to the first duct, and wherein the heat dissipation section is arranged on an outer periphery of the image sensor.

* * * * *